US010382206B2

(12) United States Patent
Muhanna et al.

(10) Patent No.: US 10,382,206 B2
(45) Date of Patent: Aug. 13, 2019

(54) AUTHENTICATION MECHANISM FOR 5G TECHNOLOGIES

(71) Applicant: Futurewei Technologies, Inc., Plano, TX (US)

(72) Inventors: Ahmad Shawky Muhanna, Richardson, TX (US); Marcus Wong, Green Brook, NJ (US)

(73) Assignee: Futurewei Technologies, Inc., Plano, TX (US)

(*) Notice: Subject to any disclaimer, the term of this patent is extended or adjusted under 35 U.S.C. 154(b) by 227 days.

(21) Appl. No.: 15/453,776

(22) Filed: Mar. 8, 2017

(65) Prior Publication Data
US 2017/0264439 A1  Sep. 14, 2017

Related U.S. Application Data

(60) Provisional application No. 62/306,550, filed on Mar. 10, 2016, provisional application No. 62/317,295, (Continued)

(51) Int. Cl.
*H04L 9/08* (2006.01)
*H04L 9/14* (2006.01)
(Continued)

(52) U.S. Cl.
CPC .......... *H04L 9/3242* (2013.01); *H04L 9/0861* (2013.01); *H04L 9/14* (2013.01);
(Continued)

(58) Field of Classification Search
None
See application file for complete search history.

(56) References Cited

U.S. PATENT DOCUMENTS

| 8,861,732 B2 * | 10/2014 | Suh ................ H04W 12/04 380/255 |
| 9,037,112 B2 * | 5/2015 | Rajadurai ............ H04L 9/0822 380/270 |

(Continued)

FOREIGN PATENT DOCUMENTS

| CN | 101938741 A | 1/2011 |
| CN | 102036242 A | 4/2011 |

(Continued)

OTHER PUBLICATIONS

Huerta-Canepa et al, "An encryption scheme based on trust for device-to-device communication on 5G", 2015, IEEE, p. 360-362.*

(Continued)

*Primary Examiner* — Christopher A Revak
(74) *Attorney, Agent, or Firm* — Slater Matsil, LLP

(57) ABSTRACT

Embodiment mutual authentication and security agreement (MASA) protocols may use independently generated integrity and/or encryption keys to securely communicate private information exchanged between UEs and various network-side devices (e.g., base stations, MMEs, HSSs, etc.). In particular, embodiment MASA protocols may use an initial authentication request (IAR) encryption key ($KIAR_{ENC}$) to encrypt UE specific information (e.g., an IMSI, etc.) in an IAR message and/or an initial authentication response (IAS) encryption key ($KIAS_{ENC}$) to encrypt private information in an IAS message. Additionally, embodiment MASA protocols may use an IAR integrity protection key ($KIAR_{INT}$) to verify the integrity of information in an IAR message and/or an IAS integrity protection key ($KIAS_{INT}$) to verify the integrity of information in an IAS message. The $KIAR_{ENC}$, $KIAR_{INT}$, $KIAS_{ENC}$, and/or $KIAS_{INT}$ may be independently computed by the UE and a home subscriber server (HSS).

29 Claims, 12 Drawing Sheets

Related U.S. Application Data filed on Apr. 1, 2016, provisional application No. 62/383,223, filed on Sep. 2, 2016, provisional application No. 62/399,069, filed on Sep. 23, 2016, provisional application No. 62/399,055, filed on Sep. 23, 2016.

(51) Int. Cl.
| | | |
|---|---|---|
| *H04L 9/30* | (2006.01) | |
| *H04L 9/32* | (2006.01) | |
| *H04L 29/06* | (2006.01) | |
| *H04W 12/02* | (2009.01) | |
| *H04W 12/06* | (2009.01) | |
| *H04W 12/10* | (2009.01) | |
| *H04W 12/00* | (2009.01) | |

(52) U.S. Cl.
CPC .............. *H04L 9/30* (2013.01); *H04L 9/3247* (2013.01); *H04L 9/3273* (2013.01); *H04L 63/0428* (2013.01); *H04W 12/02* (2013.01); *H04W 12/06* (2013.01); *H04W 12/10* (2013.01); *H04L 2209/80* (2013.01); *H04W 12/00514* (2019.01)

(56) References Cited

U.S. PATENT DOCUMENTS

| | | | | |
|---|---|---|---|---|
| 9,055,437 | B2* | 6/2015 | Kurokawa | H04L 9/3242 |
| 9,504,011 | B1* | 11/2016 | Batchu | H04W 68/02 |
| 10,111,089 | B2* | 10/2018 | Park | H04W 12/04 |
| 2007/0264997 | A1* | 11/2007 | Chaudhary | H04L 63/08 |
| | | | | 455/426.1 |
| 2010/0228967 | A1* | 9/2010 | Hahn | H04W 12/06 |
| | | | | 713/155 |
| 2013/0170643 | A1* | 7/2013 | Xiao | H04L 63/08 |
| | | | | 380/270 |
| 2013/0227663 | A1 | 8/2013 | Cadenas Gonzalez | |
| 2014/0298433 | A1 | 10/2014 | Mclaughlin et al. | |
| 2016/0005042 | A1* | 1/2016 | Tervo | G06Q 20/4014 |
| | | | | 705/67 |
| 2016/0210612 | A1* | 7/2016 | Tervo | G06Q 20/3255 |
| 2018/0013568 | A1* | 1/2018 | Muhanna | H04L 9/14 |
| 2018/0063135 | A1* | 3/2018 | Hahn | H04L 63/0876 |

FOREIGN PATENT DOCUMENTS

| | | |
|---|---|---|
| CN | 103974248 A | 8/2014 |
| CN | 104754581 A | 7/2015 |

OTHER PUBLICATIONS

Ginzboorg et al, "Privacy of the long-term identities in cellular networks", Jun. 18-20, 2016, IW5GS 2016, p. 167-175.*

"3rd Generation Partnership Project; Technical Specification Group Services and System Aspects; 3GPP System Architecture Evolution (SAE); Security architecture (Release 13)," 3GPP TS 33.401 V13.0.0, Sep. 2015, 131 pgs.

"3rd Generation Partnership Project; Technical Specification Group Services and System Aspects; 3G Security; Security architecture (Release 13)," 3GPP TS 33.102 V13.0.0, Jan. 2016, 76 pgs.

NEC Corporation, "Relay authentication and secure channel,"3GPP TSG-SA3 (Security), S3-101075, SA3#Ad Hoc, Sep. 27-29, 2010, Riga, Latvia, 6 pages.

3rd Generation Partnership Project; Technical Specification Group Services and System Aspects; Rationale and track of security decisions in Long Term Evolved (LTE) RAN / 3GPP System Architecture Evolution (SAE) (Release 8), 3GPP TR 33.821, V0.7.0, Feb. 2008, 122 pages.

3GPP TS 33.401 V13.1.0 (Dec. 2015); 3rd Generation Partnership Project; Technical Specification Group Services and System Aspects; 3GPP System Architecture Evolution (SAE); Security architecture (Release 13), 135 pages.

Huawei et al., "A clarification for 4G USIM term in solution 2.12", 3GPP TSG SA WG3 (Security) Meeting #86 S3-170429-was 170041, Feb. 6-10, 2017, 3 pages, Sophia-Antipolis (France).

Huawei et al. "Removing EN on More sophisticated replay protection in solution 2.12", 3Gpp TSG SA WG3 (Security) Meeting #86 S3-170431 was 170046, Feb. 6-10, 2017, 2 pages, Sophia-Antipolis (France).

Nokia, "pCR on evaluation of solution 2.12 (MASA)", 3GPP TSG SA WG3 (Security) Meeting #86 S3-170433, Feb. 6-10, 2017, 4 pages, Sophia Antipolis ( France).

Huawei et al., "MASA Update", 3GPP TSG SA WG3 (Security) Meeting #87 S3-171193, May 16-19, 2017, 12 Pages, Ljubljana, Slovenia.

* cited by examiner

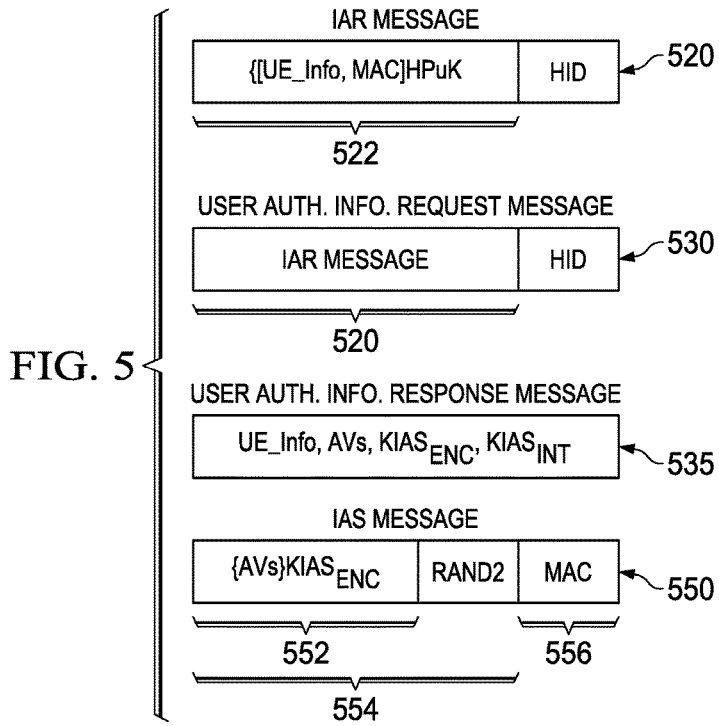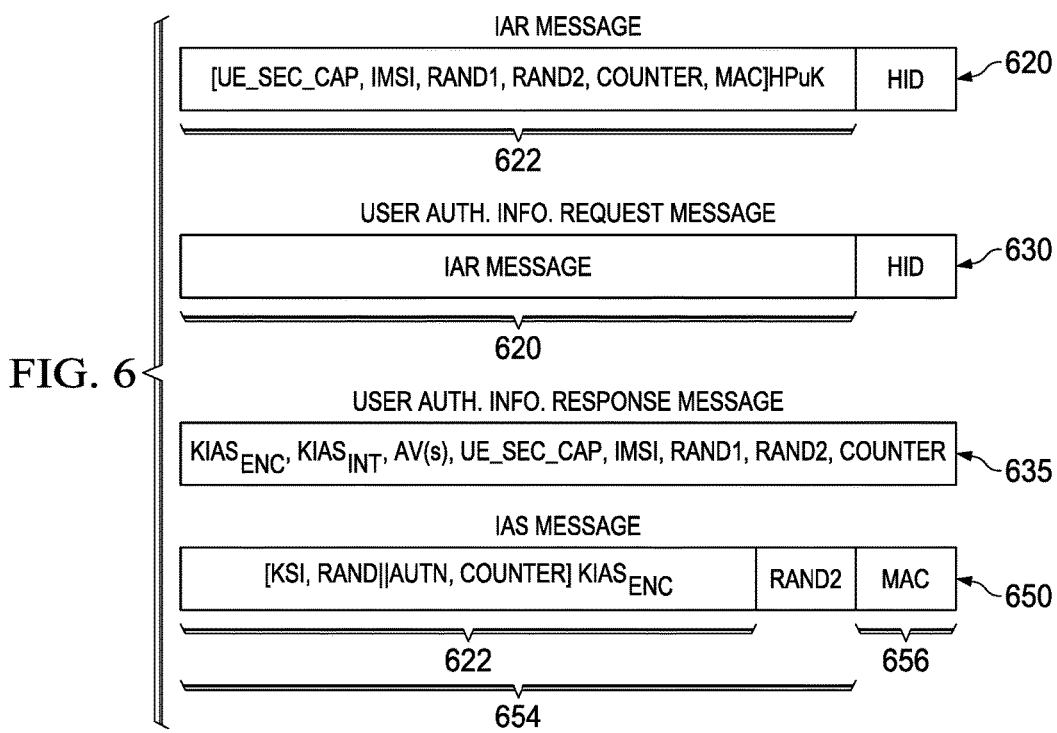

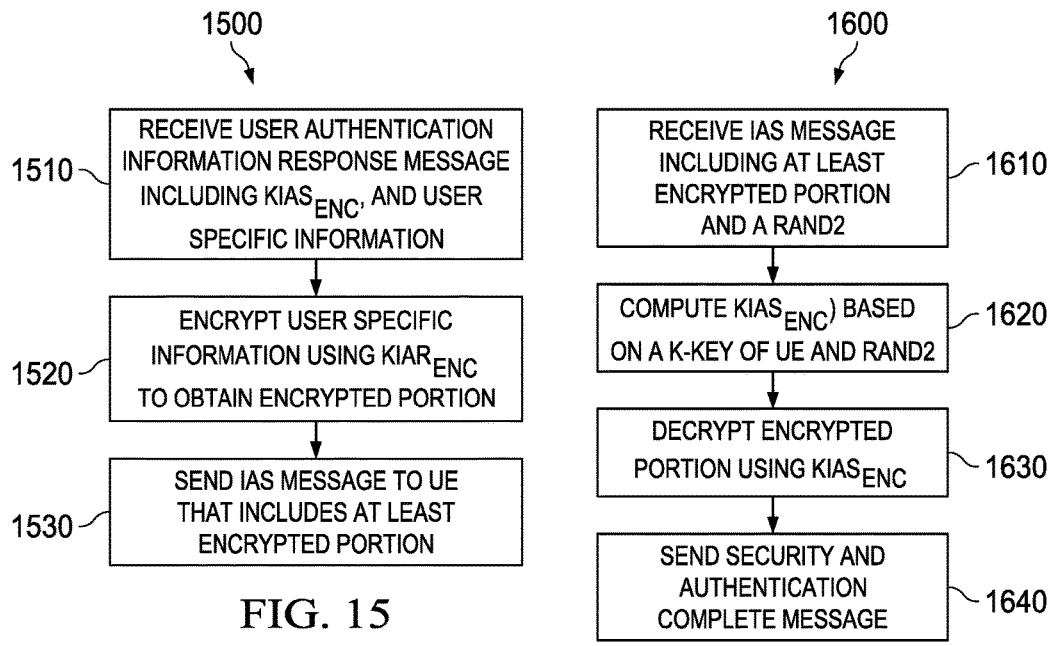
FIG. 15
FIG. 16
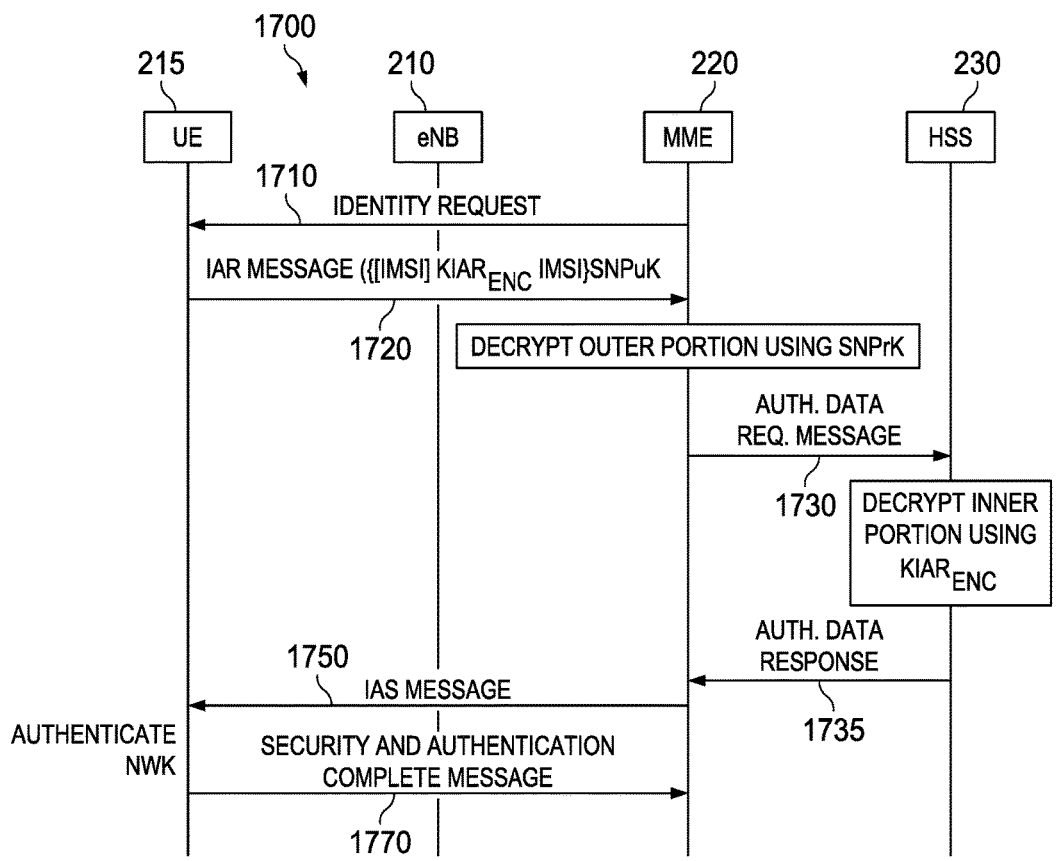
FIG. 17

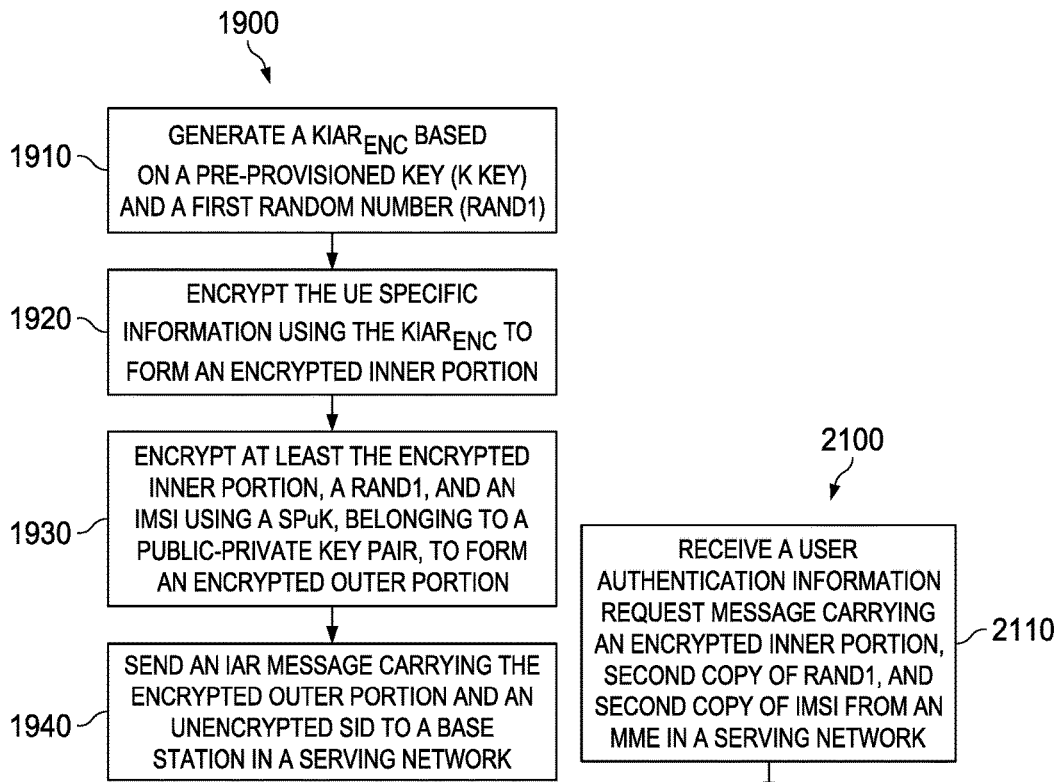
FIG. 19
FIG. 20
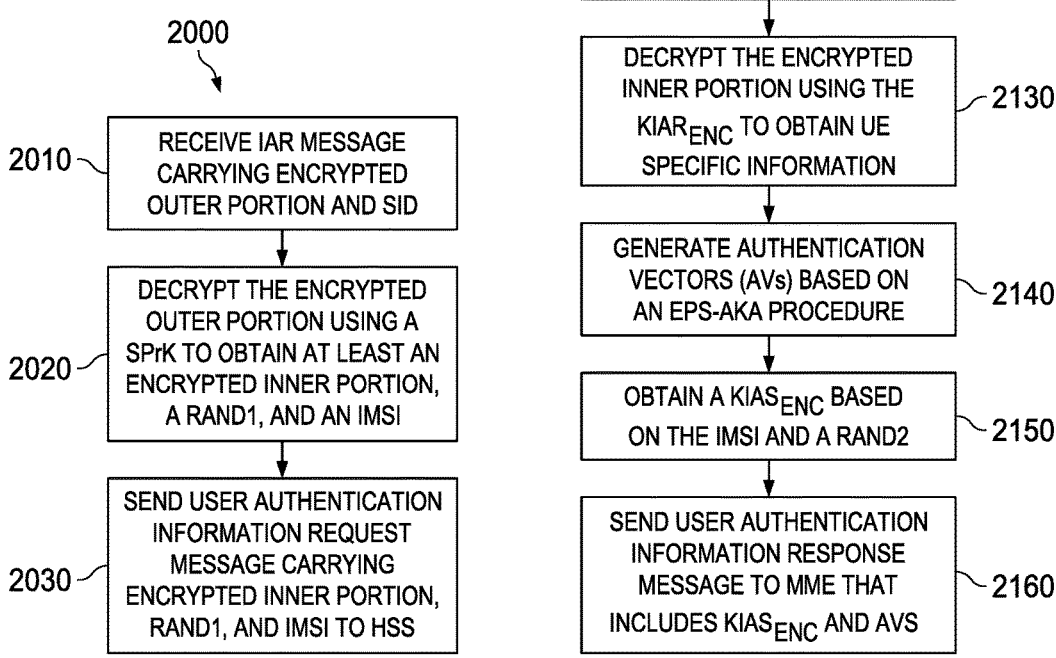
FIG. 21

US 10,382,206 B2

AUTHENTICATION MECHANISM FOR 5G TECHNOLOGIES

This application claims priority to each of U.S. Provisional Application 62/306,550 entitled "Authentication Mechanism for 5G Technologies" and filed on Mar. 10, 2016, U.S. Provisional Application 62/317,295 entitled "Authentication Mechanism for 5G Technologies" filed on Apr. 1, 2016, U.S. Provisional Application 62/383,223 entitled "Systems and Methods for Integrity Protecting Serving Network Messages" and filed on Sep. 2, 2016, U.S. Provisional Application 62/399,069 entitled "System and Method for 5G MASA using 4G USIM" and filed on Sep. 23, 2016, and U.S. Provisional Application 62/399,055 entitled "System and Method for Negotiating UE Security Capabilities with 3GPP Next Generation Network" filed on Sep. 23, 2016, all of which are incorporated by reference herein as if reproduced in their entireties.

TECHNICAL FIELD

The present invention relates generally to wireless telecommunications, and, in particular embodiments, to a system and method for authentication mechanisms for 5G technologies while providing privacy to subscriber and UE permanent identifiers.

BACKGROUND

Modern wireless networks typically include various security features to prevent unauthorized third parties from access and/or manipulating data. In particular, long term evolution (LTE) networks provide three basic security features, namely: LTE authentication, non-access stratum (NAS) security, and access stratum (AS) security. The LTE authentication feature ensures that a user is an authorized subscriber to the network (or network service) that the user is attempting to access, while the NAS security and AS security features ensure that control and user data communicated over a radio access network (RAN) is secure at the NAS and AS levels, respectively.

SUMMARY

Technical advantages are generally achieved, by embodiments of this disclosure which describe authentication mechanisms for 5G technologies.

In accordance with an embodiment, a method for secure authentication is provided. In this example, the method includes generating a first integrity key based at least on a pre-provisioned key (K key) of the UE and a first random number (RAND1), and generating a message authentication code (MAC) signature by computing a hash function of UE specific information using the first integrity key. The UE specific information includes at least an International Mobile Subscriber Identity (IMSI) of the UE and the RAND1. The method further includes encrypting the UE specific information and the MAC signature using a public key to form an encrypted portion, and sending an initial authentication request message to a base station in a serving network. The initial authentication request message carrying the encrypted portion and an unencrypted network identifier. An apparatus for performing this method is also provided.

In accordance with another embodiment, another method for secure authentication is provided. In this example, the method includes receiving a user authentication information request message from a mobility management entity (MME) in a serving network that includes a home network identifier (HID) and an encrypted portion, and decrypting the encrypted portion using a home network private key associated with the HID to obtain user equipment (UE) specific information and a first Message authentication code (MAC) signature. The UE specific information includes at least an International Mobile Subscriber Identity (IMSI) of the UE and a first random number (RAND1). The method further includes obtaining a first integrity key based on the IMSI of the UE and the RAND1, and verifying the integrity of the user authentication information request message. Verifying the integrity of the user authentication information request message comprises generating a second MAC signature by computing a hash function of UE specific information using the first integrity key, and comparing the second MAC signature with the first MAC signature to determine whether the UE specific information originated from the UE. An apparatus for performing this method is also provided.

In accordance with yet another embodiment, yet another method for secure authentication is provided. In this example, the method includes generating a first encryption key based on a pre-provisioned key of the UE and a first random number (RAND1), encrypting at least an International Mobile Subscriber Identity (IMSI) of the UE and the RAND1 using the first encryption key to form an encrypted inner portion, encrypting at least the inner portion, the RAND1, and the IMSI using a public key to form an encrypted outer portion, and sending an initial authentication request message to a base station in a serving network. The initial authentication request message carries the encrypted outer portion and an unencrypted network identifier. An apparatus for performing this method is also provided.

In accordance with yet another embodiment, yet another method for secure authentication is provided. In this example, the method includes receiving an initial authentication request message from a user equipment (UE) that includes an encrypted outer portion and an unencrypted network identifier, decrypting the encrypted outer portion using a private key associated with the serving network to obtain an International Mobile Subscriber Identity (IMSI) of the UE, a first random number (RAND1), and an encrypted inner-portion, and sending an authentication and data request message to a home subscriber server (HSS) in a home network of the UE. The authentication and data request message includes at least the IMSI, RAND1, and the encrypted inner portion. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 is a diagram of embodiment frame formats for messages exchanged during the embodiment communications sequence depicted by FIG. 4;

FIG. 6 is a diagram of additional embodiment frame formats for messages exchanged during the embodiment communications sequence depicted by FIG. 4;

FIG. 15 is a flowchart of an embodiment method for processing an authentication and data response message and generating an IAS message according to a MASA protocol;

FIG. 16 is a flowchart of an embodiment method for processing an IAS message according to a MASA protocol;

FIG. 17 is a protocol diagram of yet another embodiment communications sequence for authenticating a UE in a wireless network;

FIG. 19 is a flow chart of an embodiment method for generating an IAR message according to a MASA protocol;

FIG. 20 is a flowchart of an embodiment method for processing an IAR message and generating an authentication and data request message according to a MASA protocol;

FIG. 21 is a flow chart of an embodiment method for processing an authentication and data request message and generating an authentication and data response message according to a MASA protocol;

DETAILED DESCRIPTION OF ILLUSTRATIVE EMBODIMENTS

Figure 1:
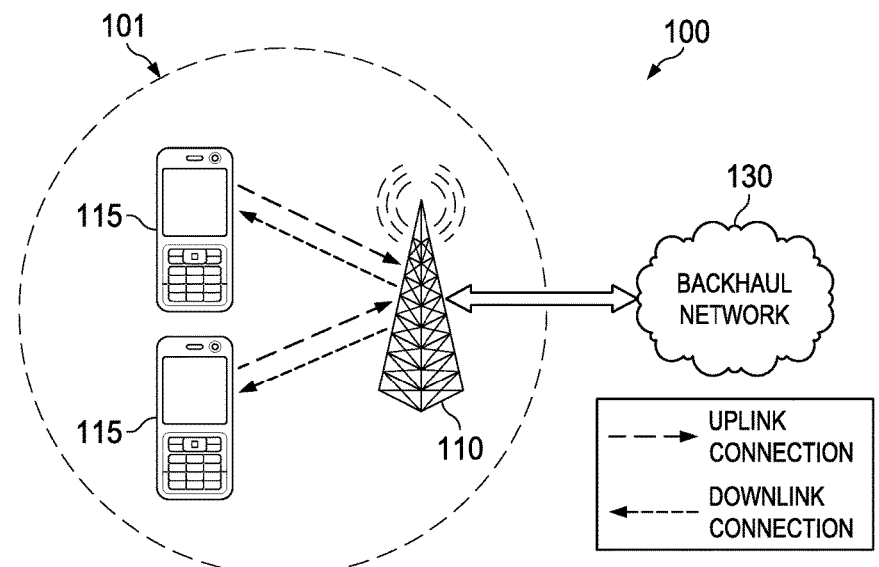
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

The LTE authentication and NAS security protocols are usually performed sequentially, during which time mutual authentication is established between the UE and the serving network and NAS layer encryption keys are generated. In particular, a UE sends an International Mobile Subscriber Identity (IMSI) to a mobility management entity (MME) in a serving network. The MME then sends the IMSI to a home subscriber server (HSS) in a home network of the UE, which generates Evolved Packet System (EPS) authentication vectors. The EPS authentication vectors are then communicated to the MME, where they are used to authenticate the UE and generate NAS layer encryption keys in accordance with an authentication and key agreement (AKA) procedure. Thereafter, the NAS layer encryption keys are used to encrypt signaling exchanged between the UE and the MME.

When using conventional LTE authentication protocols, an unencrypted IMSI is communicated from the UE to the access point. This creates a potential security vulnerability because the IMSI is private information that can be exploited by malicious third parties to engage in unauthorized activities, such as tracking the UE and/or engaging denial of service attacks. Accordingly, techniques for securely communicating the IMSI during LTE authentication are desired.

Aspects of this disclosure provide embodiment mutual authentication and security agreement (MASA) protocols that use independently generated integrity and/or encryption keys to securely communicate private information exchanged between UEs and various network-side devices (e.g., base stations, MMEs, HSSs, etc.). In particular, embodiment MASA protocols may use an initial authentication request (IAR) encryption key ($KIAR_{ENC}$) to encrypt UE specific information (e.g., an IMSI, etc.) in an IAR message and/or an initial authentication response (IAS) encryption key ($KIAS_{ENC}$) to encrypt private information in an IAS message. Additionally, embodiment MASA protocols may use an IAR integrity protection key ($KIAR_{INT}$) to verify the integrity of information in an IAR message and/or an IAS integrity protection key ($KIAS_{INT}$) to verify the integrity of information in an IAS message. The $KIAR_{ENC}$, $KIAR_{INT}$, $KIAS_{ENC}$, and/or $KIAS_{INT}$ may be independently computed by the UE and a home subscriber server (HSS) based on, for example, a pre-provisioned key (K-key) of the UE and one or more random numbers (e.g., RAND1, RAND2, UE random number ($RAND_{UE}$), home network random number ($RAND_{HN}$), and/or a COUNTER. Using a COUNTER to compute an instance of a given key may be useful in ensuring that each generated instance of the key differs from previous generated instances of the key, as it is possible that the same random number could be selected to generate different instances of a key, which could constitute a security vulnerability.

Different levels of encryption and/or integrity protection can be achieved depending on the complexity of the embodiment MASA protocol. In one embodiment, a low complexity MASA protocol use integrity keys (e.g., a $KIAR_{INT}$ and/or a $KIAS_{INT}$) to provide integrity protection when communicating IAR and/or IAS messages having a single layer of encryption protection. In particular, a UE may encrypt UE specific information (e.g., an IMSI, random numbers, etc.) using a home network public key (HPuK) to form an encrypted portion, and then generate a media access control (MAC) signature by computing a hash function of the encrypted portion, and potentially additional information (e.g., a random number) in an outer portion of the IAR message, using a $KIAR_{INT}$. The UE may then send an IAR message carrying the encrypted portion and the MAC signature to a base station in a serving network, which may relay the IAR message to an MME. The MME may encapsulate the IAR message into a user authentication data request message, which may then be sent to a home subscriber server (HSS) in the UE's home network. The HSS may independently compute a MAC signature of the contents of the IAR message based on an independently generate integrity key (e.g., the $KIAR_{INT}$), and then compare the independently generated MAC signature with the MAC signature included in the IAR message to verify the integrity of the encrypted portion of the IAR message. A similar procedure can be used to provide integrity protection for the IAS message.

In another embodiment, a higher complexity MASA protocol uses encryption keys (e.g., $KIAR_{ENC}$ and/or $KIAS_{ENC}$) in conjunction with the home network public-private key pair to provide two layers of encryption for the contents of IAR and/or IAS messages. In particular, a UE may use a pre-provisioned key and a first random number (RAND1) to generate an initial authentication request encryption key ($KIAR_{ENC}$). The $KIAR_{ENC}$ is then used to encrypt private information to form an encrypted inner portion of an authentication request message. The private information may include the IMSI of the UE, the RAND1, a second random number (RAND2), UE-Security-Capabilities, and/or a counter. Next, the UE may encrypt the RAND1, the IMSI, and the encrypted inner portion to obtain an encrypted outer portion of the authentication request message. Other information may also be encrypted when generating the encrypted outer portion. The public key used to generate the encrypted outer portion may belong to a private-public-key-pair. In one embodiment, the public key is a home network public key (HPuK). In another embodiment, the public key is a serving network public key (SPuK). Thereafter, the UE may send the authentication request message carrying the encrypted outer portion and an unencrypted network identifier to an MME in the serving network. If the public key used to generate the encrypted outer portion was a SPuK, then the unencrypted network identifier in the authentication request message may be a serving network identifier (SID). In that case, the MME may use a serving network private key to decrypt the encrypted outer portion and obtain the RAND1, the IMSI, and the encrypted inner portion, which may then be forwarded to a home subscriber server (HSS) in a home network of the UE. Alternatively, if the public key used to generate the encrypted outer portion was a HPuK, then the unencrypted network identifier in the authentication request message may be a home network identifier (HID). In that case, the MME would send an authentication and data request carrying the encrypted outer portion, along with the HID, MME security capability identifiers, to the HSS in the home network. The HSS would then decrypt the encrypted outer portion using a home network private key and obtain the RAND1, the IMSI, and the encrypted inner portion.

In both cases, the HSS would then use the RAND1 and a K key associated with the UE to independently generate the $KIAR_{ENC}$, which the HSS would subsequently use to decrypt the encrypted inner portion. The HSS would then verify that IMSI in the decrypted inner portion matched the IMSI in the decrypted outer portion to verify that the encrypted outer portion had not been tampered with by an unauthorized third party. Thereafter, the HSS may verify that the counter in the decrypted inner portion matched a counter maintained by the HSS initial authentication request (IAR) was fresh (i.e., not stale). If the validations were successful, then the HSS may generate an initial authentication response encryption key ($KIAS_{ENC}$) based on the RAND2 and the K key associated with the IMSI. The HSS may also generate one or more authentication vectors. The HSS may then send an initial authorization and data response to the MME that includes the $KIAS_{ENC}$ and the authentication vectors. In some embodiments, the initial authorization and data response includes a UE security capability parameter. The MME may then select one of the authentication vectors, as well as a non-access stratum (NAS) ciphering algorithm. The MME may also assign a temporary network identifier (e.g., a globally unique temporary identifier (GUTI)) to the UE. Thereafter, the MME may encrypt the $KIAS_{ENC}$, the temporary network identifier, and a key set identifier (KSI) associated with the selected NAS ciphering algorithm using the $KIAS_{ENC}$ to obtain encrypted NAS security data. The encrypted NAS security data may include other information as well, such as the counter and the RAND2. The MME may then send an initial authentication and data response to the UE carrying the encrypted NAS security data as well as an unencrypted RAND2. The UE may then independently generate the $KIAS_{ENC}$ based on the RAND2 and the K key. The UE may then generate a ciphering key using the NAS ciphering algorithm associated with the KSI in the decrypted NAS security data. The UE may then return a security authentication complete message to the MME, confirming that the serving network has been authenticated. Encrypting the IMSI, as well as the temporary network ID, in the manner described herein allows that information to be securely exchanged during LTE authentication and NAS security protocols. Additionally, the embodiment procedures described herein reduce the number of messages exchanged between the UE and the base station during LTE authentication and NAS security protocols. These and other details are discussed in greater detail below.

FIG. 1 illustrates a network 100 for communicating data. The network 100 comprises a base station 110 having a coverage area 101, a plurality of mobile devices 115, and a backhaul network 130. As shown, the base station 110 establishes uplink (dashed line) and/or downlink (dotted line) connections with the mobile devices 115, which serve to carry data from the mobile devices 115 to the base station 110 and vice-versa. Data carried over the uplink/downlink connections may include data communicated between the mobile devices 115, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
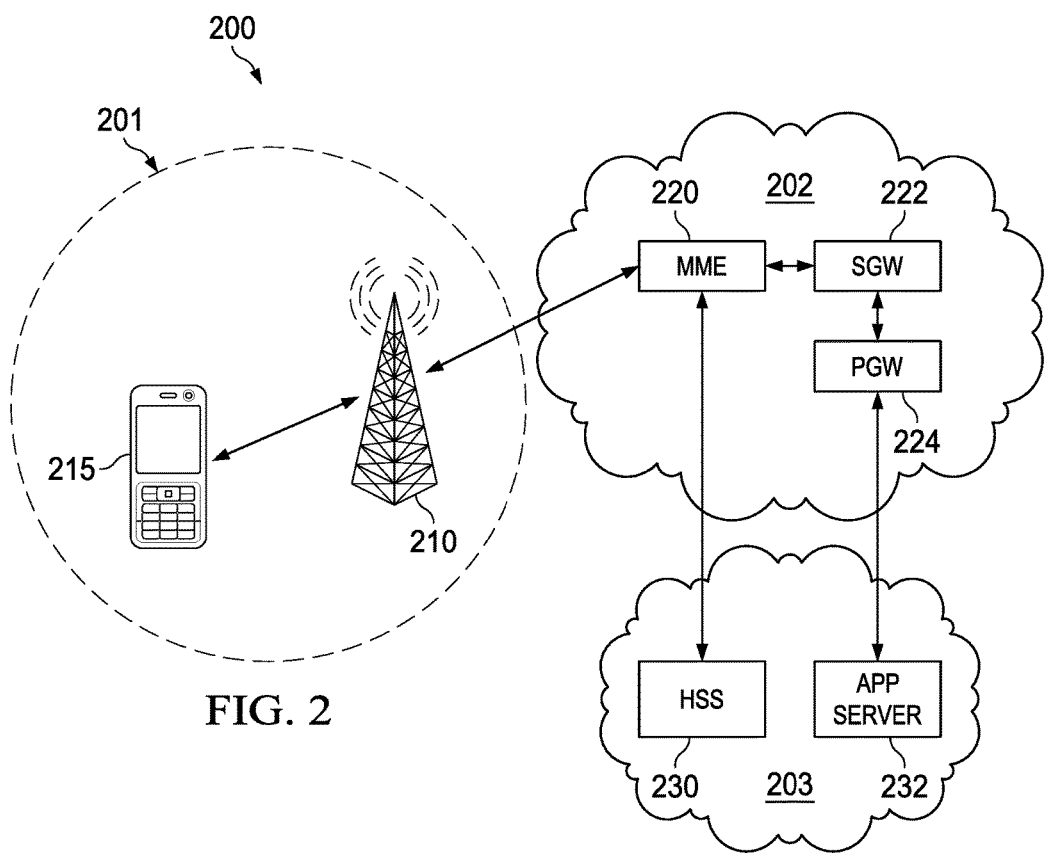
FIG. 2 is a diagram of a 5G network architecture.

FIG. 2 illustrates a network architecture 200 for a 5G LTE wireless network. As shown, the network architecture 200 includes a radio access network (RAN) 201, an evolved packet core (EPC) 202, and a home network 203 of a UE 215 attempting to access the RAN 201. The RAN 201 and the EPC 202 form a serving wireless network. The RAN 201 includes a base station 210, and the EPC 202 includes a mobility management entity (MME) 220, a serving gateway (SGW) 222, and a packet data network (PDN) gateway (PGW) 224. The MME 220 is the termination point in the network for ciphering/integrity protection for NAS signaling and handles the security key management. It should be appreciated that the term "MME" is used in 4G LTE networks, and that 5G LTE networks may include a Security Anchor Node (SEAN) or a Security Access Function (SEAF) that performs similar functions. The terms "MME," "SEAN," and "SEAF" are used interchangeably throughout this document. The MME 220 also provides the control plane function for mobility between LTE and 2G/3G access networks, as well as an interface to home networks of roaming UEs. The SGW 222 routes and forwards user data packets, while also acting as a mobility anchor for the user plane during handovers. The PGW 224 provides connectivity from UEs to external packet data networks by being the point of exit and entry of traffic for the UEs. The HSS 230 is a central database that contains user-related and subscription-related information.

Figure 3:
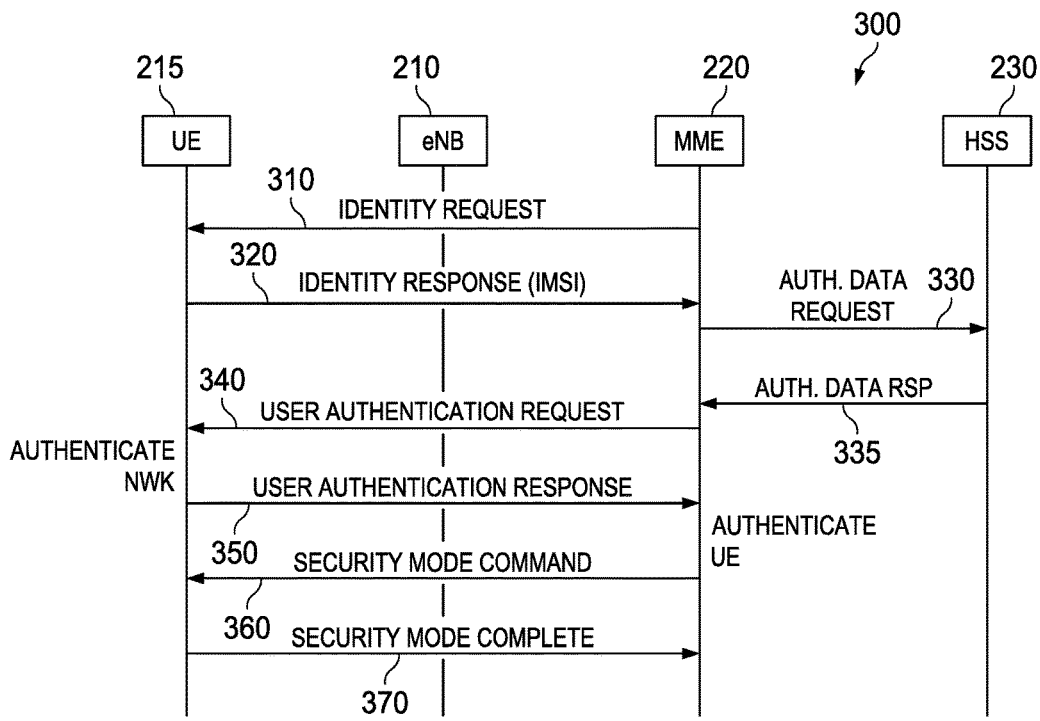
FIG. 3 is a protocol diagram of a conventional communications sequence for authenticating a UE in a wireless network.

Conventional LTE authentication protocols communicate an unencrypted IMSI of the UE over the radio access network, which presents security vulnerability. FIG. 3 illustrates a protocol diagram of a conventional communications sequence 300 for authenticating the UE 215 in a wireless network. As shown, the communications sequence 300 begins when the MME 220 communicates an identity request 310 to the UE 215. Next, the UE 215 communicates an identity response 320 to the MME 220. The identity response 320 includes an unencrypted IMSI of the UE 215. Thereafter, the MME 220 communicates an authorization data request 330 to the HSS 230. The authorization data request 330 may include the IMSI. The HSS 230 then computes EPS authentication vectors, and sends an authorization data response 335 carrying the EPS authentication vectors to the MME 220. Subsequently, the MME 220 communicates a user authentication request 340 to the UE 215. The user authentication request 340 includes a random number (RAND) and an authentication parameter (AUTN). The UE 215 computes an authentication response (RES) based on the RAND, AUTN, and a secret key. The secret key may be a priori information to the UE 215. For example, the secret key (e.g., a subscriber-specific master key (K)) may be stored in a Universal Subscriber Identity Module (USIM) of the UE 215. The UE 215 may then send a user authentication response 350 carrying the authentication response (or RES) to the MME 220.

Thereafter, the MME 220 communicates a security mode command message 360 to the UE 215. The security mode command message 360 may indicate an integrity protection algorithm and a ciphering algorithm. The UE 215 may use the integrity protection algorithm to verify the integrity of the security mode command message 360. After verifying the integrity of the security mode command message 360, the UE 215 uses the ciphering algorithm to derive NAS encryption keys. The UE 215 then sends the security mode complete message 370 to the MME 220 to verify that the UE 215 validated the security mode command message 360, and derived the NAS encryption keys.

In some instances, a third party may eavesdrop on the communications sequence 300 in an attempt to intercept one or more of the messages 310-370. If the identity response 320 is intercepted, then the third party may use the unencrypted IMSI to perform unauthorized activities, such as to track the UE 215.

Aspects of this disclosure prevent, or at least inhibit, unauthorized third parties from obtaining an IMSI of a UE during LTE authentication by encrypting the IMSI using a public key. The public key may be a part of a public-private key pair such that information encrypted with the public key can only be decrypted with the private key. In one example, the public key is a home network public key, and the encrypted IMSI is decrypted by an HSS in the home network of the UE using a home network private key. In such an example, the home network public key may be a priori information of the UE, e.g., the home network public key may be stored in a USIM of the UE. In another example, the public key is a serving network public key (SPuK), and the encrypted IMSI is decrypted by an MME in the serving network using a serving network private key. Other examples are also possible.

Figure 4:
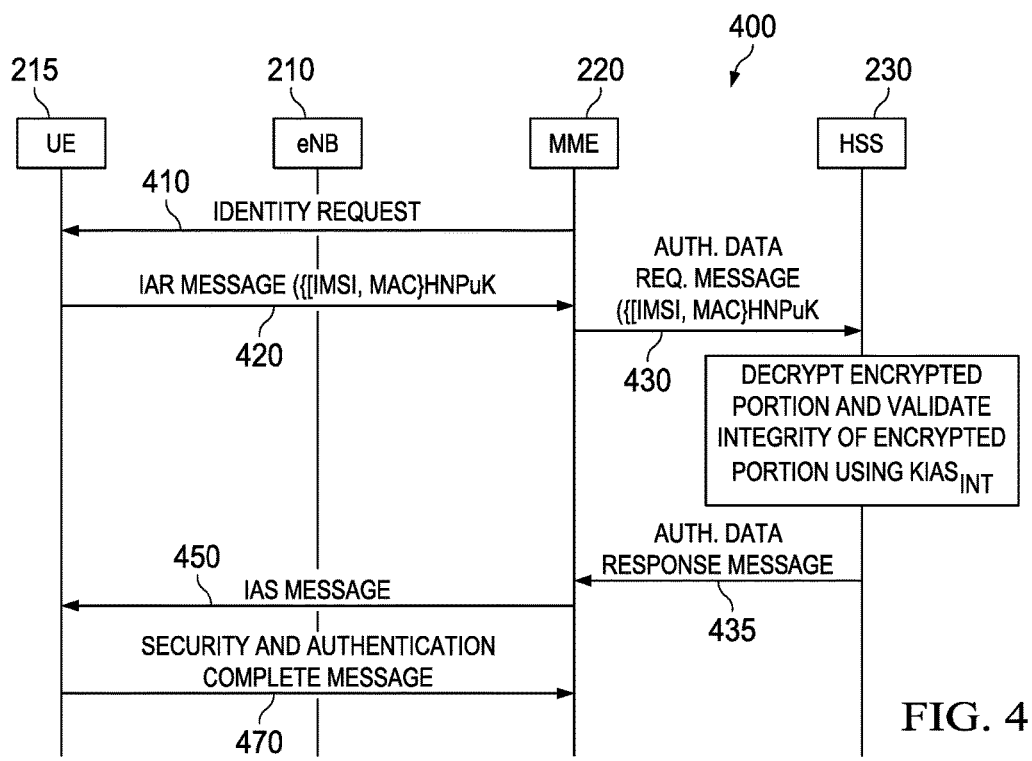
FIG. 4 is a protocol diagram of an embodiment communications sequence for authenticating a UE in a wireless network.

FIG. 4 illustrates a protocol diagram of an embodiment communications sequence 400 for authenticating a UE 215 in a wireless network. As shown, the communications sequence 400 begins when the MME 220 communicates an identity request 410 to the UE 215. Upon receiving the identity request 410, the UE 215 generates a MAC signature by computing a hash of UE specific information (e.g., an IMSI, a RAND1, etc.) using a $KIAR_{INT}$, and then encrypts the UE specific information along with the MAC signature using a HPuK to obtain an encrypted portion. The UE 215 sends an initial authentication request (IAR) message 420 carrying the encrypted portion to the base station 210, which relays the IAR message 420 to the MME 220. The IAR message 420 may also include a unencrypted home network ID (HID) of the home network of the UE 215.

Upon receiving the IAR message 420, the MME 220 may identify the home network of the UE 215 based on the unencrypted HID, and communicate an authentication and data request message 430 to the HSS 230 in the identified home network. Upon receiving the authentication and data request message 430, the HSS 230 may decrypt encrypted portion using a HPrK, and verify the integrity of the encrypted portion based on the MAC signature. In one example, the HSS 230 independently generates a MAC signature by computing a hash of the information in the authentication and data request message 430 using an independently generated integrity key (e.g., a $KIAR_{INT}$), and then compares the independently generated MAC signature with the MAC signature carried by the encrypted portion in the authentication and data request 430. The HSS 230 may also take further steps to validate the encrypted portion. For example, the HSS 230 may verify that a COUNTER in the encrypted portion of the authentication and data request message 430 (e.g., a counter originally in the IAR message 420) exceeds an independent COUNTER maintained by the HSS 230 in order to confirm that the encrypted portion in the authentication and data request message 430 is fresh (e.g., not stale). If the encrypted portion is stale, then it may have been intercepted by a malicious man-in-the-middle entity.

After verifying the integrity of the encrypted portion(s), the HSS 230 may generate authentication vectors based on an EPS-AKA procedure, and send an authentication and data response message 435 carrying the EPS authentication vectors to the MME 220. The authentication and data response message 435 may include other information in addition to the EPS authentication vectors, such as integrity/encryption keys (e.g., a $KIAS_{INT}$, $KIAS_{ENC}$, etc.), the IMSI of the UE, a COUNTER, and/or a UE security capabilities. The UE security capabilities may indicate protocol capabilities supported by the UE, such as, for example, NAS ciphering algorithms supported by the UE.

The MME 220 may then send an initial authentication response (IAS) message 450 to the UE 215. The IAS message 450 may have various different frame formats, and the contents of the IAS message 450 may vary depending on the frame format being used. In one example, the IAS message 450 includes encrypted NAS security data and a key set identifier (KSI) associated with a NAS ciphering algorithm. The UE 215 may use the NAS ciphering algorithm along with an independently generated encryption key (e.g., a $KIAS_{ENC}$) to decrypt the encrypted NAS security data. After decrypting the encrypted NAS security data, the UE 215 may send a security and authentication complete message 470 to the MME 220.

As mentioned above, the IAR message 420, the authentication and data request message 430, the user authentication information response message 435, and the IAS message 450 may have various different frame formats. FIG. 5 illustrates frame formats for an embodiment IAR message 520, an embodiment authentication and data request message 530, an embodiment authentication and data response message 535, and an embodiment IAS message 550.

The embodiment IAR message 520 corresponds to the IAR message 420 sent from the UE 215 to the MME 220. In this example, the embodiment IAR message 520 includes UE Specific information (UE_info), a MAC signature, and a home network identifier (HID). The UE_info may include various information associated with, or generated by, the UE, including (but not limited to) an IMSI, one or more random numbers (e.g., RAND1, RAND2, etc.), a counter, and/or UE security capability parameters. The MAC signature may be generated by computing a hash function of the UE_info according to an integrity key (e.g., a $KIAR_{INT}$) and/or a random number (e.g., RAND1). The MAC signature and the UE_info are encrypted using a HPuK to form an encrypted portion 522 of the embodiment IAR message 520.

The embodiment authentication and data request message 530 corresponds to the authentication and data request message 430 sent from the MME 220 to the HSS 230. As shown, the embodiment authentication and data request message 530 includes the embodiment IAR message 520 and an HID.

The embodiment authentication and data response message 535 corresponds to the authentication and data response message 435 sent from the HSS 230 to the MME 220. As shown, the user authentication information response message 535 includes UE_info (e.g., an IMSI, counter, RAND1, RAND2, UE security capabilities, etc.), as well as authentication vectors (AVs), a $KIAS_{ENC}$, and a $KIAS_{INT}$.

The embodiment IAS message 550 corresponds to the IAS message 450 sent from the MME 220 to the UE 215. As shown, the IAS message 450 includes an encrypted inner portion 552, an outer portion 554, and a MAC 556. The encrypted inner portion 552 is formed by encrypting the AVs using a $KIAS_{ENC}$. It should be appreciated that the encrypted inner portion 552 may include other information (e.g., a KSI) in addition to the AVs. The outer portion 554 includes a RAND2 and the encrypted inner portion 552. The MAC signature 556 is generated by computing a hash of the outer portion 554 using the $KIAS_{INT}$ Other frame formats are also possible. FIG. 6 illustrates frame formats for an embodiment IAR message 620, an embodiment authentication and data request message 630, an embodiment authentication and data response message 635, and an embodiment IAS message 650.

The embodiment IAR message 620 corresponds to the IAR message 420 sent from the UE 215 to the MME 220. In this example, the embodiment IAR message 620 includes an encrypted portion 622 and a home network identifier (HID). The encrypted portion 622 is generated by using an HPuK to encrypt a UE security capability parameter (UE_SEC_CAP), an IMSI, a RAND1, a RAND2, a COUNTER, and a MAC signature. The MAC signature is generated by computing by using a $KIAR_{INT}$ to compute a hash of the UE_SEC_CAP, the IMSI, the RAND1, the RAND2, and the COUNTER.

The embodiment authentication and data request message 630 corresponds to the authentication and data request message 430 sent from the MME 220 to the HSS 230. As shown, the embodiment authentication and data request message 630 includes the embodiment IAR message 620 and an HID.

The embodiment authentication and data response message 635 corresponds to the authentication and data response message 435 sent from the HSS 230 to the MME 220. As shown, the authentication and data response message 635 includes a $KIAS_{ENC}$, a $KIAS_{INT}$, AV(s), a UE_SEC_CAP, an IMSI, a RAND1, a RAND2, and a COUNTER.

The embodiment IAS message 650 corresponds to the IAS message 450 sent from the MME 220 to the UE 215. As shown, the IAS message 450 includes an encrypted inner portion 652, an outer portion 654, and a MAC signature 656. The encrypted inner portion 652 is formed by encrypting a KSI, and a RAND||AUTN using the $KIAS_{ENC}$. The RAND||AUTN may specify two or more parameters included in, or derived by the AVs, and may be used by the UE to authenticate the network and generate a response, e.g., the security and authentication complete message 470, etc. It should be appreciated that the encrypted inner portion 652 may include other UE specific information. The outer portion 654 includes a RAND2 and the encrypted inner portion 652. The MAC signature 656 is generated by computing a hash of the outer portion 654 using the $KIAS_{INT}$.

Figure 7:
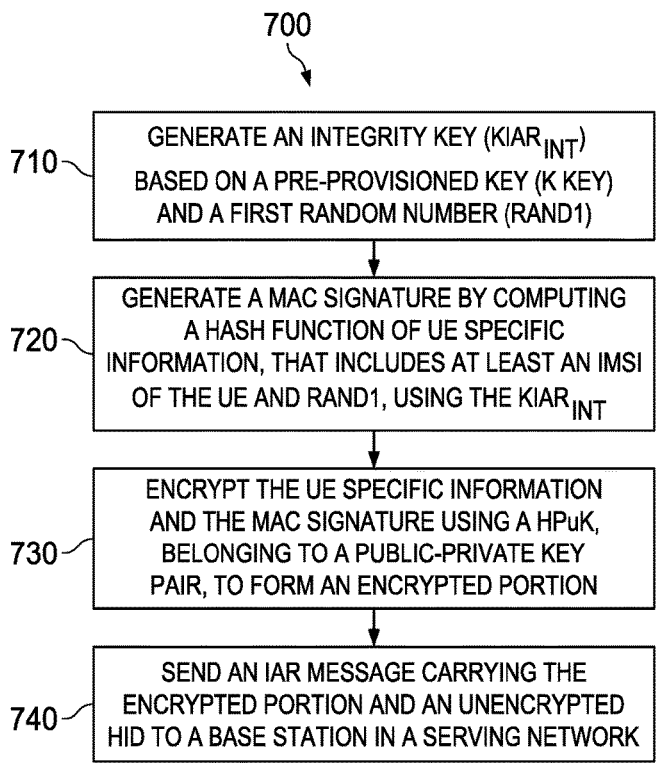
FIG. 7 is a flow chart of an embodiment method for generating an initial authentication request (IAR) message according to a MASA protocol.

Embodiments of this disclosure provide methods for performing MASA protocols. FIG. 7 is a flowchart of an embodiment method 700 for generating an IAR message according to a MASA protocol, as may be performed by a UE. At step 710, the UE generates a $KIAR_{INT}$ based on a pre-provisioned key (K key) and a first random number (RAND1). At step 720, the UE generates a MAC signature by computing a hash function of UE specific information using the $KIAR_{INT}$. The UE specific information includes at least an IMSI of the UE and the RAND1. At step 730, the UE encrypts the UE specific information and the MAC signature using a home network public key (HPuK) to form an encrypted portion. The HPuK belongs to a public-private key pair such that the encrypted portion can only be decrypted using a home network private key (HPrK) belonging to the public-private key pair. At 740, the UE sends an IAR message carrying the encrypted portion and an unencrypted home network identifier (HID) to a base station in a serving network. The base station relays the IAR message to an MME, which sends an authentication and data request message that includes the encrypted portion of the IAR message to an HSS server in a home network associated with the unencrypted network identifier in the IAR message.

Figure 8:
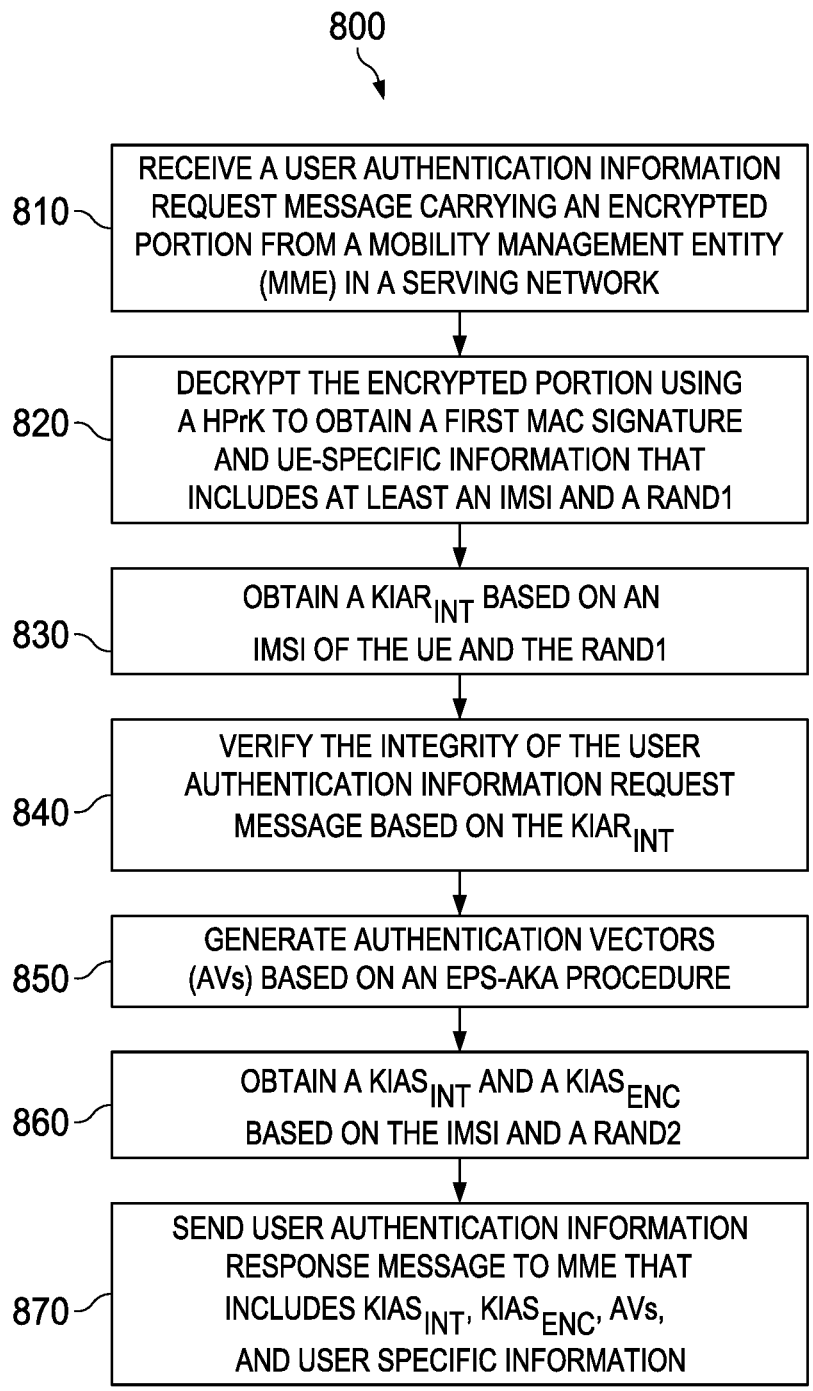
FIG. 8 is a flow chart of an embodiment method for processing an authentication and data request message and generating an authentication and data response message according to a MASA protocol.

FIG. 8 is a flowchart of an embodiment method 800 for processing an authentication and data request message and generating an authentication and data response message according to a MASA protocol, as may be performed by an HSS. At step 810, the HSS receives an authentication and data request message from a mobility management entity (MME) in a serving network. The authentication and data request message carries an encrypted portion.

At step 820, the HSS decrypts the encrypted portion using a HPrK to obtain a first MAC signature and UE-specific information. The UE-specific information includes at least an IMSI and a RAND1. At step 830, the HSS obtains a $KIAR_{INT}$ based on the IMSI and the RAND1. In one example, the HSS obtains the $KIAR_{INT}$ by sending the IMSI and the RAND1 to an authentication server, which looks up a pre-provisioned key (K-key) based on the IMSI, generates the $KIAR_{INT}$ based on the K-key and the RAND1, and returns the $KIAR_{INT}$ to the HSS. At step 840, the HSS verifies the integrity of the encrypted portion based on the $KIAR_{INT}$. In particular, the HSS generates a second MAC signature by computing a hash of UE-specific information in the encrypted portion according to the $KIAR_{INT}$, and then compares the second MAC signature with the first MAC signature. If the MAC signatures match, then the integrity of the encrypted portion is verified.

At step 850, the HSS generates authentication vectors (AVs) based on an EPS-AKA procedure. At step 860, the HSS obtains a $KIAS_{INT}$ and a $KIAS_{ENC}$ based on the IMSI of the UE and a RAND2. In one example, the HSS obtains the $KIAS_{INT}$ and the $KIAS_{ENC}$ by sending the IMSI and the RAND2 to an authentication server. The authentication server looks up a pre-provisioned key (K-key) based on the IMSI, generates the $KIAS_{INT}$ and the $KIAS_{ENC}$ based on the K-key and the RAND2, and returns the $KIAS_{INT}$ and the $KIAS_{ENC}$ to the HSS. In some embodiments, steps 830 and 860 are performed in parallel such that the IMSI, RAND1, and RAND2 are sent from the HSS to the authentication server in the same request message, and the $KIAR_{INT}$, $KIAS_{ENC}$, and $KIAS_{INT}$ are returned from the authentication server to the HSS in the same response message. At step 870, the HSS sends an authentication and data response message to the MME. The authentication and data response message includes the $KIAS_{INT}$, the $KIAS_{ENC}$, the AVs, and UE_info. In some embodiments, a COUNTER is also used when generating $KIAR_{INT}$, $KIAS_{INT}$, and $KIAS_{ENC}$.

Figure 9:
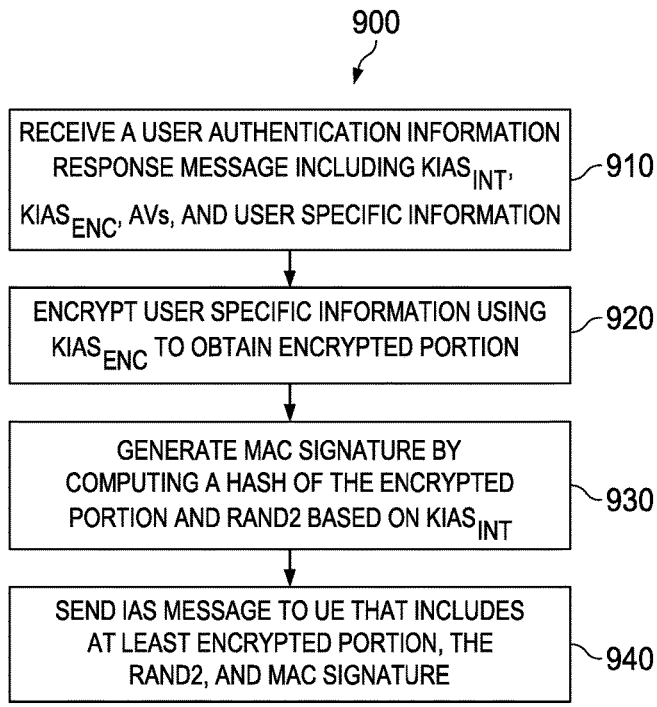
FIG. 9 is a flowchart of an embodiment method for processing an authentication and data response message and generating an initial authentication response (IAS) message according to a MASA protocol.

FIG. 9 is a flowchart of an embodiment method 900 for processing an authentication and data response message and generating an IAS message according to a MASA protocol, as may be performed by an MME. At step 910, the MME receives an authentication and data response message from an HSS that includes a $KIAS_{INT}$, a $KIAS_{ENC}$, AVs, and user specific information. The user specification information may include a UE security capabilities parameter, an IMSI, a RAND2, and/or a COUNTER.

At step 920, the MME encrypts the user specific information using the $KIAS_{ENC}$ to obtain an encrypted portion. At step 930, the MME generates a MAC signature by computing a hash of the encrypted portion and the RAND2 based on the $KIAS_{INT}$. At step 940, the MME sends an IAS message to a UE that includes at least the encrypted portion, the RAND2, and MAC signature.

Figure 10:
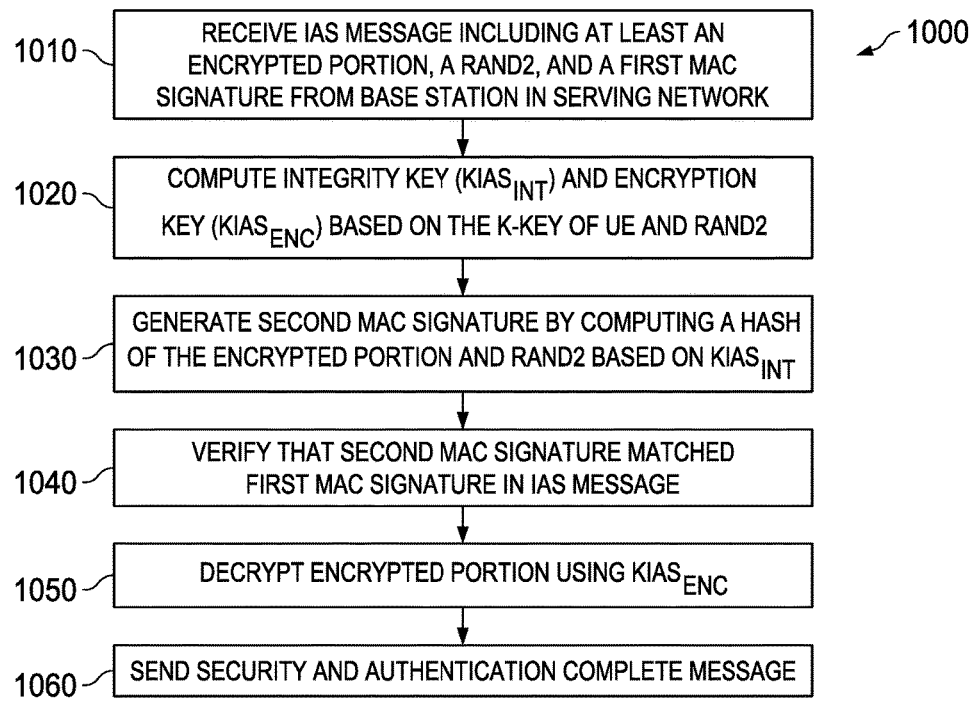
FIG. 10 is a flowchart of an embodiment method for processing an IAS message according to a MASA protocol.

FIG. 10 is a flowchart of an embodiment method 1000 for processing an IAS message according to a MASA protocol, as may be performed by a UE. At step 1010, the UE receives an IAS message from a base station in a serving network. The IAS message includes at least an encrypted portion, a RAND2, and a first MAC signature. At step 1020, the UE computes a $KIAS_{INT}$ and a $KIAS_{ENC}$ based on a K-key of UE and the RAND2. In some embodiments, step 1020 and 720 may be performed in parallel (e.g., by a SIM card in the UE) prior to sending an initial IAR message. At step 1030, the UE generates a second MAC signature by computing a hash of the encrypted portion and the RAND2 based on the $KIAS_{INT}$. At step 1040, the UE verifies that the second MAC signature matches the first MAC signature in the IAS message. At step 1050, the UE decrypts the encrypted portion using the $KIAS_{ENC}$. At step 1060, the UE sends a security and authentication complete message to the MME confirming that the network has been authenticated.

Figure 11:
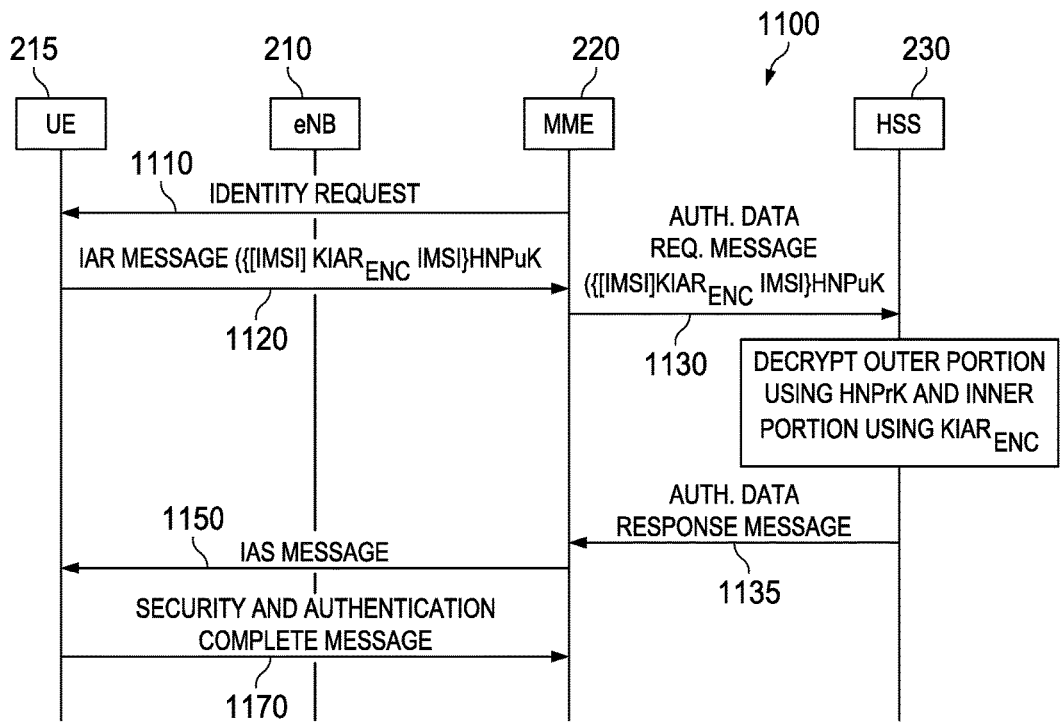
FIG. 11 is a protocol diagram of another embodiment communications sequence for authenticating a UE in a wireless network.

Aspects of this disclosure prevent, or at least inhibit, unauthorized third parties from obtaining an IMSI of a UE during LTE authentication by encrypting the IMSI using a $KIAR_{ENC}$. FIG. 11 illustrates a protocol diagram of an embodiment communications sequence 1100 for authenticating a UE in a wireless network. As shown, the communications sequence 1100 begins when the MME 220 communicates an identity request 1110 to the UE 215. Next, the UE 215 encrypts a first copy of the IMSI using a $KIAR_{ENC}$ to form an encrypted inner portion, and encrypts a second copy of the IMSI and the encrypted inner portion using an HPuK to form an encrypted outer portion. It should be appreciated that other UE specific information (e.g., RAND1, RAND2, COUNTER, UE_SEC_CAP, etc.) may be encrypted along with the IMSI when forming the encrypted inner portion and/or the encrypted outer portion. Thereafter, the UE sends an IAR message 1120 carrying the encrypted outer portion to the MME 220. In some embodiments, the UE 215 sends the IAR message 1120 without having received the identity request 1110. The IAR message 1120 may include an unencrypted home network ID (HID) of the home network of the UE 215. Upon receiving the IAR message 1120, the MME 220 forwards an authentication and data request message 1130 carrying the encrypted outer portion to the HSS 230. The authentication and data request message 1130 may include other information in addition to the encrypted outer portion, such as MME security capability parameters that identify the NAS security capabilities of the MME 220, e.g., which NAS ciphering algorithms are supported by the MME 220. The authentication and data request 1130 may also include a serving network identifier (SID) and network type (NWK Type) of the serving network of the MME 220.

Upon receiving the authentication and data request message 1130, the HSS 230 may decrypt the encrypted outer portion using a HPrK to obtain the second copy of the IMSI and the encrypted inner portion. The HSS 230 may then decrypt the encrypted inner portion using the $KIAR_{ENC}$ to obtain the first copy of the IMSI. In some embodiments, the HSS 230 validates the authentication and data request message 1130 by comparing the first copy of IMSI with the second copy of the IMSI. The HSS 230 may also compare the COUNTER with a corresponding COUNTER maintained by the HSS 230 to determine whether the authentication and data request 1130 is fresh (e.g., not stale). If the validation is successful, then the HSS 230 generates authentication vectors based on an EPS-AKA procedure, and sends an authentication and data response message 1135 carrying the EPS authentication vectors and a $KIAS_{ENC}$ to the MME 220.

Subsequently, the MME 220 selects one of the authentication vectors, as well as a non-access stratum (NAS) ciphering algorithm. The MME 220 may also assign a temporary network identifier (e.g., a globally unique temporary identifier (GUTI)) to the UE. Thereafter, the MME 220 may encrypt, the temporary network identifier, and a key set identifier (KSI) associated with the selected NAS ciphering algorithm using the $KIAS_{ENC}$ to obtain encrypted NAS security data. The encrypted NAS security data may include other information as well, such as the counter and the RAND2. The encrypted NAS security data may be included in the IAS message 1150 sent by the MME 220 to the UE 215. The IAS message 1150 may further include an unencrypted version of the RAND2. The UE 215 may authenticate the network by comparing RAND2 to a local version of RAND2 stored by the UE 215 and by decrypting the encrypted private information of the Authentication Response using the $KIAS_{ENC}$ key. The UE 215 then sends a security and authentication complete message 1170 to the MME 220.

Figure 12:
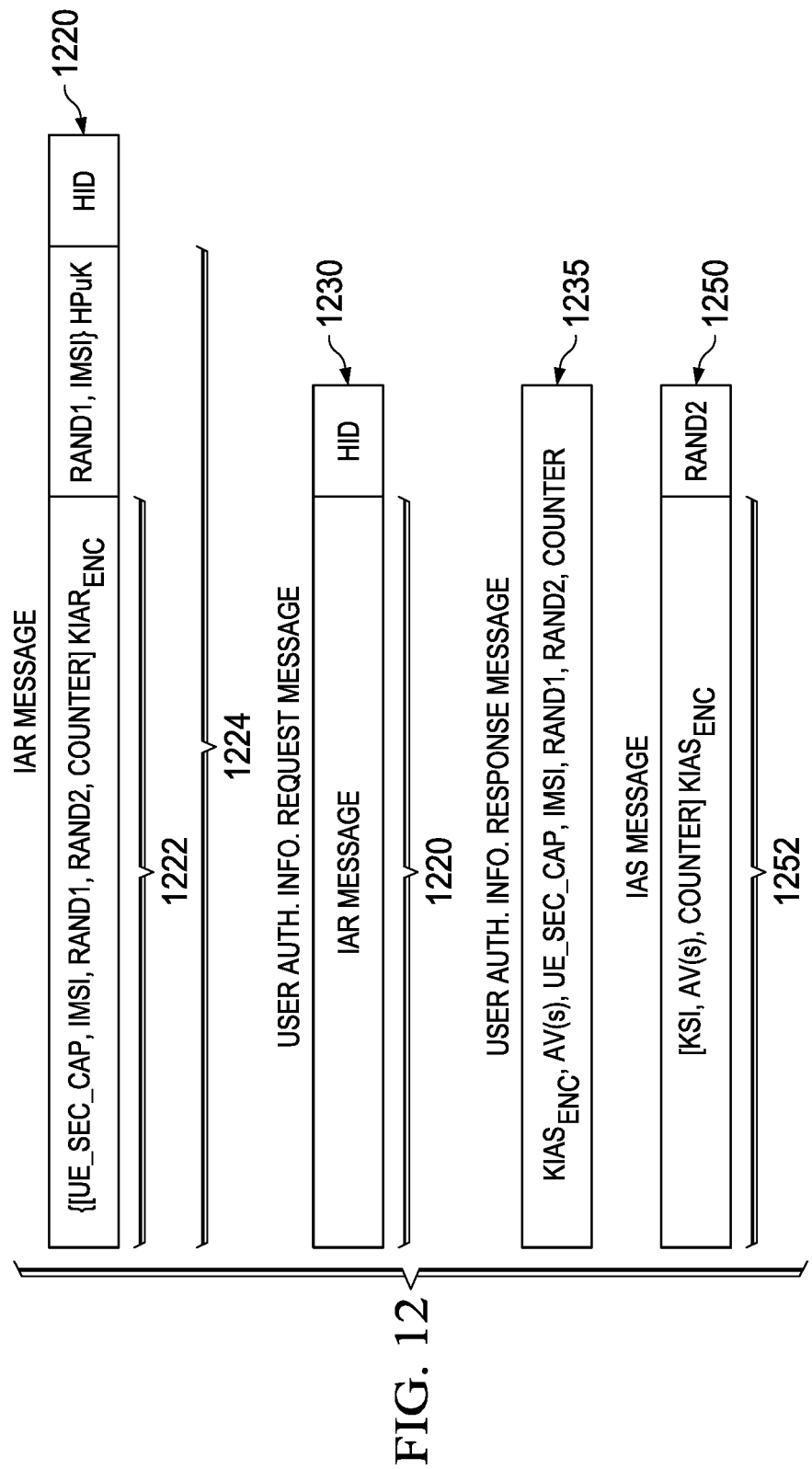
FIG. 12 is a diagram of embodiment frame formats for messages exchanged during the embodiment communications sequence depicted by FIG. 11.

FIG. 12 illustrates frame formats for an embodiment IAR message 1220, an embodiment authentication and data request message 1230, an embodiment authentication and data response message 1235, and an embodiment IAS message 1250.

The embodiment IAR message 1220 corresponds to the IAR message 1120 sent from the UE 215 to the MME 220. In this example, the embodiment IAR message 1220 includes an encrypted inner portion 1222, an encrypted outer portion 1224, and an HID. The encrypted inner portion 1222 is formed by encrypting a UE_SEC_CAP, a first copy of an IMSI, a first copy of a RAND1, a RAND2, and a COUNTER using a $KIAR_{ENC}$. The encrypted outer portion 1224 is generated by encrypting the encrypted inner portion 1222 along with a second copy of the IMSI and a second copy of the RAND1 using a HPuK. It should be appreciated that additional information may be included in the encrypted inner portion 1222 and/or the encrypted outer portion 1224.

The embodiment authentication and data request message 1230 corresponds to the authentication and data request message 1130 sent from the MME 220 to the HSS 230. As shown, the embodiment authentication and data request message 1230 includes the embodiment IAR message 1220 and an HID.

The embodiment authentication and data response message 1235 corresponds to the authentication and data response message 1135 sent from the HSS 230 to the MME 220. As shown, the authentication and data response message 1235 includes a $KIAS_{ENC}$, the UE_SEC_CAP, the IMSI, the RAND2, and the COUNTER.

The embodiment IAS message 1250 corresponds to the IAS message 1150 sent from the MME 220 to the UE 215. As shown, the IAS message 1150 includes an encrypted portion 1252 and the RAND2. The encrypted portion 1252 is formed by encrypting a KSI, the AVs, and the COUNTER using the $KIAS_{ENC}$.

Figures 13, 14:
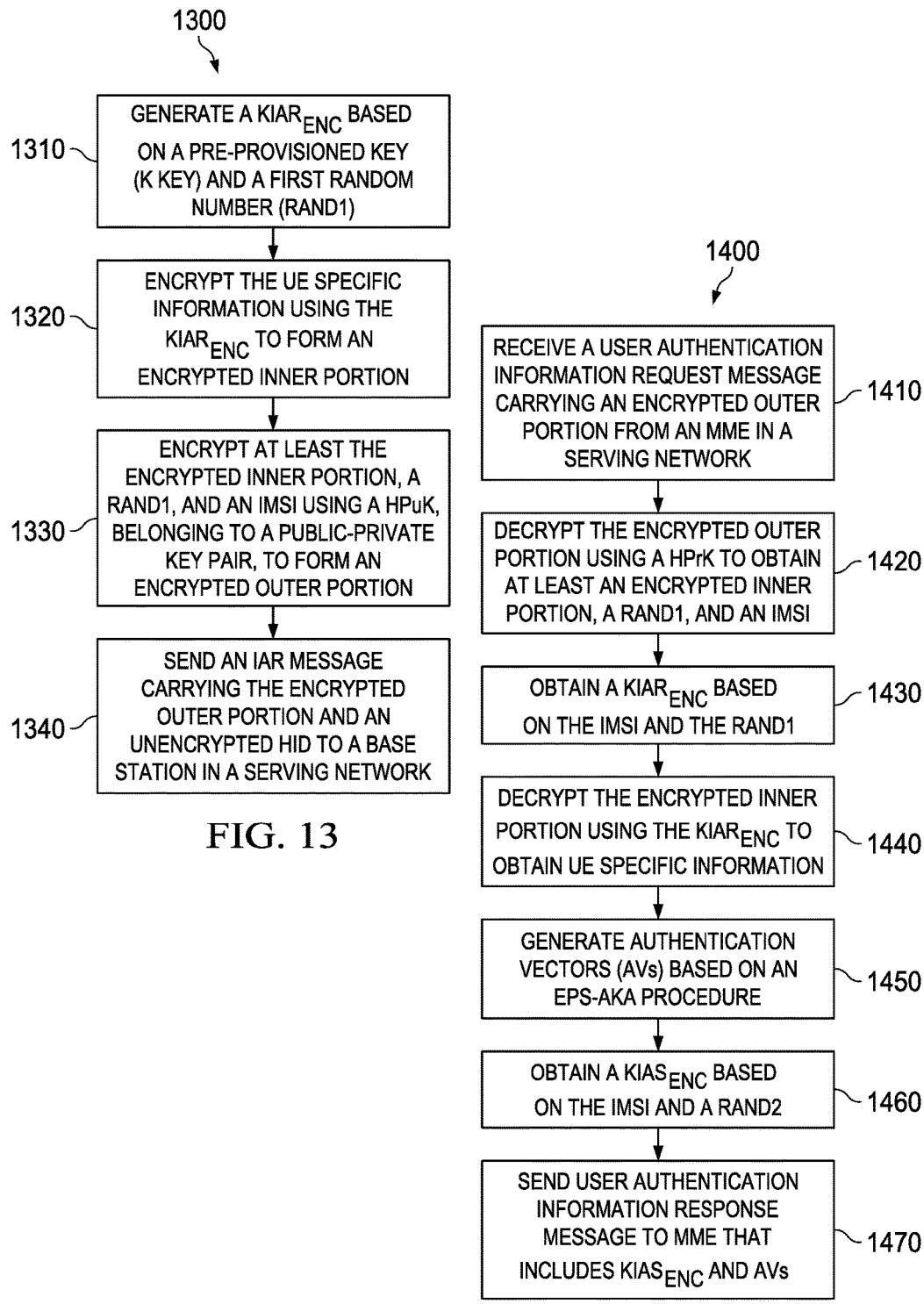
FIG. 13 is a flow chart of an embodiment method for generating an IAR message according to a MASA protocol.
FIG. 14 is a flow chart of an embodiment method for processing an authentication and data request message and generating an authentication and data response message according to a MASA protocol.

Embodiments of this disclosure provide methods for performing MASA protocols. FIG. 13 is a flowchart of an embodiment method 1300 for generating an IAR message according to a MASA protocol, as may be performed by a UE. At step 1310, the UE generates a $KIAR_{ENT}$ based on a pre-provisioned key (K key) and a RAND1. At step 1320, the UE encrypts UE specific information using the $KIAR_{ENC}$ to form an encrypted inner portion. At step 1330, the UE encrypts at least the encrypted inner portion, a RAND1, and an IMSI using an HPuK to form an encrypted outer portion. At step 1340, the UE sends an IAR message carrying the encrypted outer portion and an unencrypted HID to a base station in a serving network.

FIG. 14 is a flowchart of an embodiment method 1400 for processing an authentication and data request message and generating an authentication and data response message according to a MASA protocol, as may be performed by an HSS. At step 1410, the HSS receives an authentication and data request message from a MME in a serving network. The authentication and data request message carries an encrypted outer portion.

At step 1420, the HSS decrypts the encrypted portion using an HPrK to obtain a first MAC signature and UE-specific information. The UE-specific information includes at least an IMSI and a RAND1. At step 1430, the HSS obtains a $KIAR_{ENC}$ based on the IMSI and the RAND1. At step 1440, the HSS decrypts the encrypted inner portion using the $KIAR_{ENC}$ to obtain UE specific information. At step 1450, the HSS generates authentication vectors (AVs) based on an EPS-AKA procedure. At step 1460, the HSS obtains a $KIAS_{ENC}$ based on the IMSI and a RAND2. In some embodiments, steps 1430 and 1460 are performed in parallel such that the IMSI, RAND1, and RAND2 are sent from the HSS to the authentication server in the same request message, and the $KIAR_{ENC}$ and $KIAS_{ENC}$ are returned from the authentication server to the HSS in the same response message. At step 1470, the HSS sends an authentication and data response message to the MME. The authentication and data response message includes the $KIAS_{INT}$, the $KIAS_{ENC}$, the AVs, and UE_info.

FIG. 15 is a flowchart of an embodiment method 1500 for processing an authentication and data response message and generating an IAS message according to a MASA protocol, as may be performed by an MME. At step 1510, the MME receives an authentication and data response message from an HSS that includes a $KIAS_{ENC}$, AVs, and user specific information. The user specification information may include a UE security capabilities parameter, an IMSI, a RAND2, and/or a COUNTER.

At step 1520, the MME encrypts at least the user specific information and the AVs using the $KIAS_{ENC}$ to obtain an encrypted portion. It should be appreciated that the encrypted portion may include other information, such as a KSI. At step 1530, the MME sends an IAS message to a UE that includes at least the encrypted portion.

FIG. 16 is a flowchart of an embodiment method 1600 for processing an IAS message according to a MASA protocol, as may be performed by a UE. At step 1610, the UE receives an IAS message from a base station in a serving network. The IAS message includes at least an encrypted portion, a RAND2, and a first MAC signature. At step 1620, the UE computes a $KIAS_{INT}$ and a $KIAS_{ENC}$ based on a K-key of UE and the RAND2. In some embodiments, step 1620 and 1310 may be performed in parallel (e.g., by a SIM card in the UE) prior to sending an initial IAR message. At step 1630, the UE decrypts the encrypted portion using the $KIAS_{ENC}$. At step 1640, the UE sends a security and authentication complete message to the MME confirming that the network has been authenticated.

In some embodiments, the UE uses a serving network public key (SPuK) to encrypt a portion of an IAR message. FIG. 17 illustrates a protocol diagram of an embodiment communications sequence 1700 for authenticating a UE in a wireless network. As shown, the communications sequence 1700 begins when the MME 220 communicates an identity request 1710 to the UE 215. Next, the UE 215 encrypts a first copy of an IMSI using a $KIAR_{ENC}$ to form an encrypted inner portion, and encrypts a second copy of the IMSI and the encrypted inner portion using a SPuK to form an encrypted outer portion. It should be appreciated that other UE specific information (e.g., a RAND1, a RAND2, a COUNTER, a UE_SEC_CAP, etc.) may be encrypted along with the IMSI when forming the encrypted inner portion and/or the encrypted outer portion. Thereafter, the UE sends an IAR message 1720 carrying the encrypted outer portion to the MME 220. In some embodiments, the UE 215 sends the IAR message 1720 without having received the identity request 1710. The IAR message 1720 may include an unencrypted home network ID (SID). Upon receiving the IAR message 1720, the MME 220 determines a serving network private key (SPrK) based on the unencrypted SID, and decrypts the encrypted outer portion of the IAR message using the SPrK. The MME 220 then forwards an authentication and data request message 1730 carrying the encrypted inner portion, the second copy of the IMSI, and a RAND1 to the HSS 230. The authentication and data request message 1730 may include other information in addition to the encrypted outer portion, such as MME security capability parameters, the SID, and a NWK Type.

Upon receiving the authentication and data request message 1730, the HSS 230 may obtain the $KIAR_{ENC}$ based on the second copy of the IMSI and the RAND1, and decrypt the encrypted inner portion using the $KIAR_{ENC}$ to obtain the first copy of the IMSI. The HSS 230 may then compare the first copy of the IMSI (carried in the encrypted inner portion of the authentication and data request message 1730) with the second copy of the IMSI (carried in an unencrypted outer portion of the authentication and data request message 1730) to verify the integrity of the authentication information request message 1730. The HSS 230 may also take other steps to validate the authentication and data request message 1730. For example, the HSS 230 may compare the COUNTER in the encrypted inner portion with a corresponding COUNTER maintained by the HSS 230 to determine whether the authentication and data request 1730 is fresh (e.g., not stale). If the validation is successful, then the HSS 230 may obtain a $KIAS_{ENC}$ based on the IMSI and a random number (e.g., RAND1, RAND2, etc.), generate authentication vectors based on an EPS-AKA procedure, and send an authentication and data response message 1735 carrying the EPS authentication vectors and the $KIAS_{ENC}$ to the MME 220.

Subsequently, the MME 220 encrypts UE specific information using the $KIAS_{ENC}$ to obtain an encrypted portion, which is sent to the UE 215 via an IAS message 1750. The encrypted portion of the IAS message 1750 may include other information in addition to the UE specific information, such as a temporary network identifier and a KSI associated with a NAS ciphering algorithm. The IAS message 1750 may further include an unencrypted version of the RAND2. The UE 215 may decrypt the encrypted portion of the IAS message 1750 using a $KIAS_{ENC}$, and send a security and authentication complete message 1770 to the MME 220.

Figure 18:
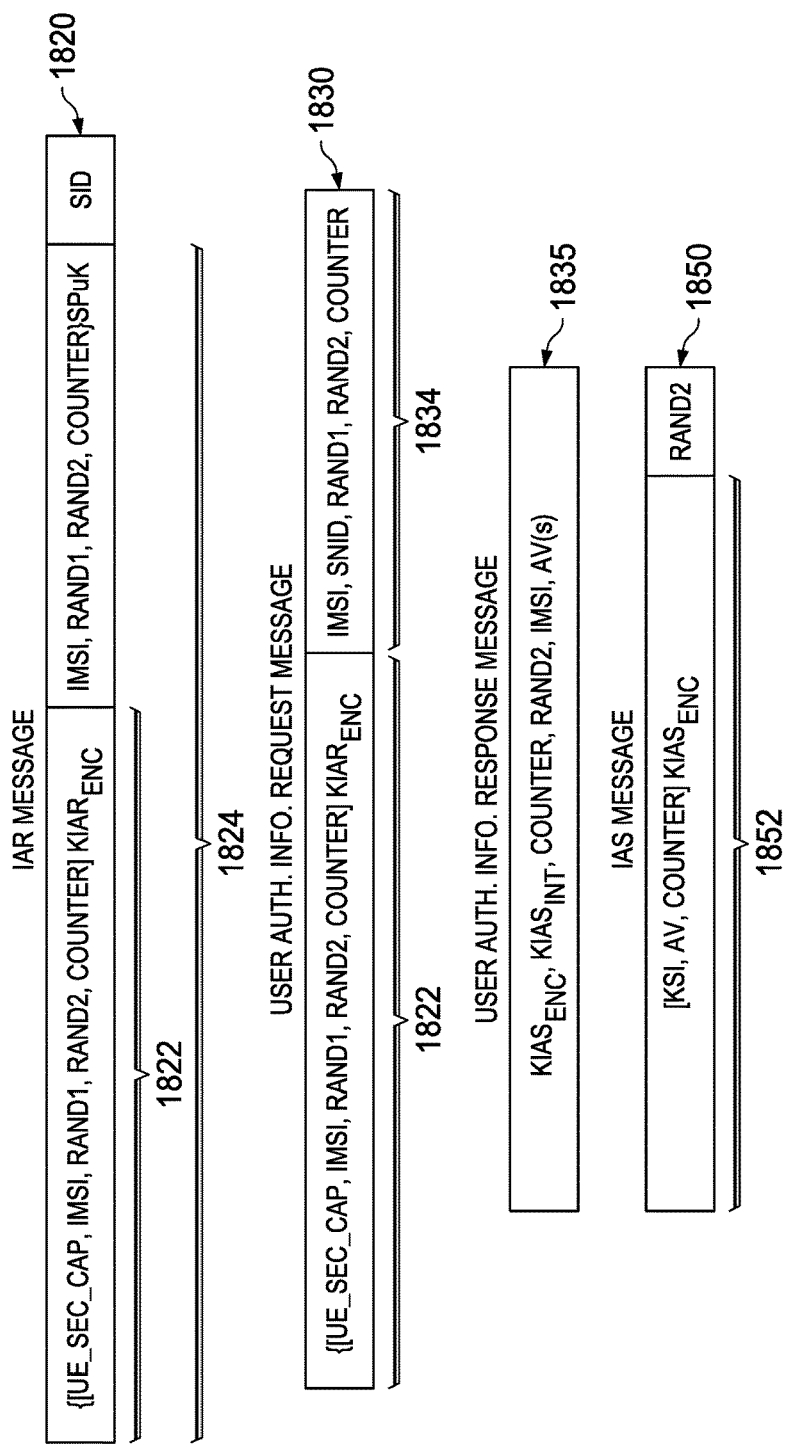
FIG. 18 is a diagram of embodiment frame formats for messages exchanged during the embodiment communications sequence depicted by FIG. 17.

FIG. 18 illustrates frame formats for an embodiment IAR message 1820, an embodiment authentication and data request message 1830, an embodiment authentication and data response message 1835, and an embodiment IAS message 1850.

The embodiment IAR message 1820 corresponds to the IAR message 1780 sent from the UE 215 to the MME 220. In this example, the embodiment IAR message 1820 includes an encrypted inner portion 1822, an encrypted outer portion 1824, and an SID. The encrypted inner portion 1822 is formed by encrypting a UE_SEC_CAP, a first copy of an IMSI, a first copy of a RAND1, a first copy of a RAND2, and a first copy of a COUNTER using a $KIAR_{ENC}$. The encrypted outer portion 1824 is generated by encrypting the encrypted inner portion 1822 along with a second copy of the IMSI, a second copy of the RAND1, a second copy of the RAND2, and a second copy of the COUNTER using a SPuK. It should be appreciated that additional information may be included in the encrypted inner portion 1822 and/or the encrypted outer portion 1824. In one embodiment, a MAC signature generated by computing a hash of the encrypted outer portion 1824 using a $KIAR_{INT}$ is also included in the IAR message 1820.

The embodiment authentication and data request message 1830 corresponds to the authentication and data request message 1730 sent from the MME 220 to the HSS 230. As shown, the embodiment authentication and data request message 1830 the encrypted inner portion 1822 from the IAR message 1820, as well as unencrypted information 1834. The unencrypted information 1834 includes the second copy of the IMSI, the second copy of the RAND1, the second copy of the RAND2, and the second copy of the COUNTER, which were obtained from decrypting the encrypted outer portion 1824 of the IAR message 1820 using the SPrK.

The embodiment authentication and data response message 1835 corresponds to the authentication and data response message 1735 sent from the HSS 230 to the MME 220. As shown, the authentication and data response message 1835 includes a $KIAS_{ENC}$, a $KIAS_{INT}$, the first copy of the COUNTER, the first copy of the RAND2, the first copy of the IMSI, and AV(s). The first copy of the RAND2 and/or the COUNTER in the authentication and data response message 1835 may provide replay protection. In this example the authentication and data response message 1835 includes both the RAND2 and the COUNTER. In another example, the authentication and data response message 1835 includes the RAND2 but excludes the COUNTER.

The embodiment IAS message 1850 corresponds to the IAS message 1750 sent from the MME 220 to the UE 215. As shown, the IAS message 1850 includes an encrypted portion 1852 and the RAND2. The encrypted portion 1852 is formed by encrypting a KSI, the AVs, and the COUNTER using the $KIAS_{ENC}$. In some examples, the embodiment IAS message 1850 includes a MAC signature that is generated by computing a hash of the encrypted portion 1852 using the $KIAS_{INT}$.

Embodiments of this disclosure provide methods for performing MASA protocols. FIG. 19 is a flowchart of an embodiment method 1900 for generating an IAR message according to a MASA protocol, as may be performed by a UE. At step 1910, the UE generates a $KIAR_{ENC}$ based on a pre-provisioned key (K key) and a RAND1. At step 1920, the UE encrypts UE specific information using the $KIAR_{ENC}$ to form an encrypted inner portion. At step 1930, the UE encrypts at least the encrypted inner portion, a RAND1, and an IMSI using a SPuK to form an encrypted outer portion. At step 1940, the UE sends an IAR message carrying the encrypted outer portion and an unencrypted SID to a base station in a serving network.

FIG. 20 is a flowchart of an embodiment method 2000 for processing an IAR message and generating an authentication and data request message according to a MASA protocol, as may be performed by an MME. At step 2010, the MME receives an IAR message carrying an encrypted outer portion and an SID. At step 2020, the MME decrypts the encrypted outer portion using a SPrK associated with the SID to obtain at least an encrypted inner portion, a RAND1, and an IMSI. At step 2030, the MME sends an authentication and data request message carrying the encrypted inner portion, the RAND1, and the IMSI to an HSS.

FIG. 21 is a flowchart of an embodiment method 2100 for processing an authentication and data request message and generating an authentication and data response message according to a MASA protocol, as may be performed by an HSS. At step 2110, the HSS receives an authentication and data request message from a MME in a serving network. The authentication and data request message carries an encrypted inner portion, a second copy of a RAND1, and a second copy of an IMSI. In some embodiments, the authentication and data request message includes a second copy of a RAND2 and/or a second copy of COUNTER.

At step 2120, the HSS obtains a $KIAR_{ENC}$ based on the second copy of the IMSI and the second copy of the RAND1. At step 2130, the HSS decrypts the encrypted inner portion using the $KIAR_{ENC}$ to obtain at least a first copy of the IMSI, a first copy of the RAND1, and a RAND2. In some embodiments, the HSS compares the first copy of the IMSI, RAND1, RAND2, and/or COUNTER with the second copy of the IMSI, RAND1, RAND2, and/or COUNTER (respectively) to verify the integrity of the authentication and data request message.

At step 2140, the HSS generates authentication vectors (AVs) based on an EPS-AKA procedure. At step 2150, the HSS obtains a $KIAS_{ENC}$ based on the IMSI and a RAND2. In some embodiments, steps 2120 and 2150 are performed in parallel such that the second copy of the IMSI, the second copy of the RAND1, and the second copy of the RAND2 are sent from the HSS to the authentication server in the same request message, and the $KIAR_{ENC}$ and $KIAS_{ENC}$ are returned from the authentication server to the HSS in the same response message. At step 2160, the HSS sends an authentication and data response message to the MME. The authentication and data response message includes the $KIAS_{ENC}$ the AVs.

In some examples, the UE 215 generates the RAND2, and includes the RAND2 in the IAR message. The RAND2 is then used by the HSS 230 to independently generate the $KIAS_{ENC}$ and/or the $KIAS_{INT}$. In other examples, the HSS 230 independently generates the RAND2, and sends the RAND2 to the authentication server. The authentication server then generates the $KIAS_{INT}$ and/or the $KIAR_{ENC}$ based on the RAND2, the k-key, and (in some cases) a COUNTER, and returns the $KIAS_{INT}$ and/or the $KIAS_{ENC}$ to the HSS 230. The HSS 230 then forwards the $KIAS_{INT}$ and/or the $KIAS_{ENC}$ to the MME 220, which may use the $KIAS_{ENC}$ and/or the $KIAS_{INT}$ to generate the IAS message. In such an example, the RAND2 and the COUNTER may be sent to the UE 214 via the IAS message, and the UE may use RAND2, the k-key, and the COUNTER to independently compute the $KIAS_{ENC}$ and/or the $KIAS_{INT}$. In an embodiment, a COUNTER is required to be included in an IAS message for purposes of replay protection when the RAND2 is independently generated by the HSS 230.

When a COUNTER is included in an authentication and data request message, the HSS may compare the COUNTER with an independent COUNTER maintained by the HSS to ensure that the COUNTER in the authentication and data request message exceeds the independent COUNTER maintained by the HSS. This may confirm that information in the authentication and data request message is fresh, as well as provide replay protection. Likewise, when a COUNTER is included in an IAS message, the UE may compare the COUNTER with an independent COUNTER maintained by the UE to ensure that the COUNTER in the IAS message exceeds the independent COUNTER maintained by the HSS. This may confirm that information within the IAS message is fresh, as well as provide replay protection.

It should be appreciated that encrypting an IMSI in an IAR message (as well as other messages) using, for example, a $KIAR_{ENC}$, a SNPuK, and/or a HNPuK serves to at least partially conceal the IMSI from malicious third parties.

It should be appreciated that a MAC signature may used to provide integrity protection for the contents of any message described herein.

Figure 22:
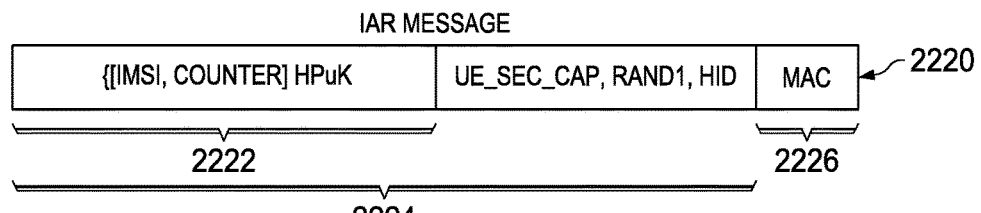
FIG. 22 is a diagram of an embodiment frame formats for an IAR message.

FIG. 22 illustrates a frame formats for an embodiment IAR message 2220. The embodiment IAR message 2220 includes an encrypted inner portion 2222, an outer portion 2224, and a MAC signature 2226. The encrypted inner portion 2222 is formed by encrypting an IMSI and a COUNTER using an HPuK. The outer portion 2224 includes the encrypted inner portion 2222, a UE_SEC_CAP, a RAND1, and an HID. The MAC 2226 is generated by computing a hash of the outer portion 2224 using a $KIAR_{INT}$.

Figure 23:
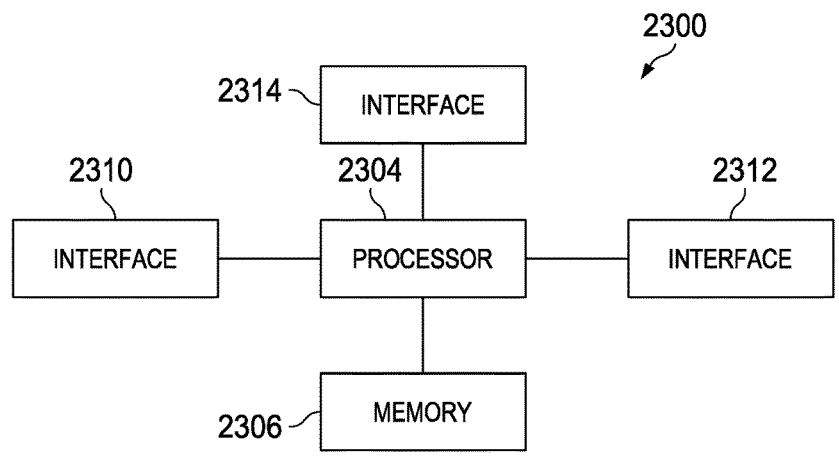
FIG. 23 is a diagram of an embodiment processing system.

FIG. 23 illustrates a block diagram of an embodiment processing system 2300 for performing methods described herein, which may be installed in a host device. As shown, the processing system 2300 includes a processor 2304, a memory 2306, and interfaces 2310-2314, which may (or may not) be arranged as shown in FIG. 23. The processor 2304 may be any component or collection of components adapted to perform computations and/or other processing related tasks, and the memory 2306 may be any component or collection of components adapted to store programming and/or instructions for execution by the processor 2304. In an embodiment, the memory 2306 includes a non-transitory computer readable medium. The interfaces 2310, 2312, 2314 may be any component or collection of components that allow the processing system 2300 to communicate with other devices/components and/or a user. For example, one or more of the interfaces 2310, 2312, 2314 may be adapted to communicate data, control, or management messages from the processor 2304 to applications installed on the host device and/or a remote device. As another example, one or more of the interfaces 2310, 2312, 2314 may be adapted to allow a user or user device (e.g., personal computer (PC), etc.) to interact/communicate with the processing system 2300. The processing system 2300 may include additional components not depicted in FIG. 23, such as long term storage (e.g., non-volatile memory, etc.).

In some embodiments, the processing system 2300 is included in a network device that is accessing, or part otherwise of, a telecommunications network. In one example, the processing system 2300 is in a network-side device in a wireless or wireline telecommunications network, such as a base station, a relay station, a scheduler, a controller, a gateway, a router, an applications server, or any other device in the telecommunications network. In other embodiments, the processing system 2300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 24:
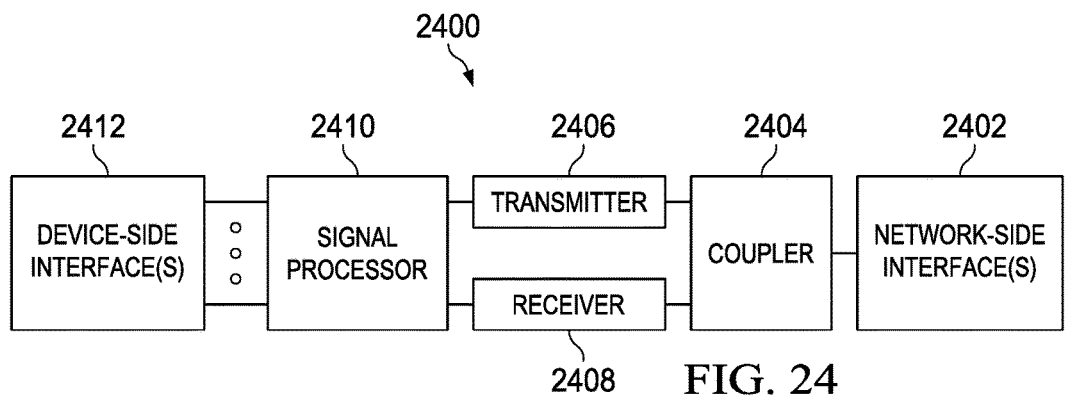
FIG. 24 is a diagram of an embodiment transceiver.

In some embodiments, one or more of the interfaces 2310, 2312, 2314 connects the processing system 2300 to a transceiver adapted to transmit and receive signaling over the telecommunications network. FIG. 24 illustrates a block diagram of a transceiver 242400 adapted to transmit and receive signaling over a telecommunications network. The transceiver 2400 may be installed in a host device. As shown, the transceiver 2400 comprises a network-side interface 2402, a coupler 2404, a transmitter 2406, a receiver 2408, a signal processor 2410, and a device-side interface 2412. The network-side interface 2402 may include any component or collection of components adapted to transmit or receive signaling over a wireless or wireline telecommunications network. The coupler 2404 may include any component or collection of components adapted to facilitate bi-directional communication over the network-side interface 2402. The transmitter 2406 may include any component or collection of components (e.g., up-converter, power amplifier, etc.) adapted to convert a baseband signal into a modulated carrier signal suitable for transmission over the network-side interface 2402. The receiver 2408 may include any component or collection of components (e.g., down-converter, low noise amplifier, etc.) adapted to convert a carrier signal received over the network-side interface 2402 into a baseband signal. The signal processor 2410 may include any component or collection of components adapted to convert a baseband signal into a data signal suitable for communication over the device-side interface(s) 2412, or vice-versa. The device-side interface(s) 2412 may include any component or collection of components adapted to communicate data-signals between the signal processor 2410 and components within the host device (e.g., the processing system 2300, local area network (LAN) ports, etc.).

The transceiver 2400 may transmit and receive signaling over any type of communications medium. In some embodiments, the transceiver 2400 transmits and receives signaling over a wireless medium. For example, the transceiver 2400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2402 comprises one or more antenna/radiating elements. For example, the network-side interface 2402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for secure authentication, the method comprising:
    generating, by a user equipment (UE), a first integrity key based at least on a pre-provisioned key (K key) of the UE and a first random number (RAND1);
    generating a message authentication code (MAC) signature by computing a hash function of UE specific information using the first integrity key, the UE specific information including at least an International Mobile Subscriber Identity (IMSI) of the UE and the RAND1;
    encrypting the UE specific information and the MAC signature using a public key to form an encrypted portion; and
    sending an initial authentication request (IAR) message to a base station in a serving network, the IAR message carrying the encrypted portion and an unencrypted network identifier.

2. The method of claim 1, wherein the public key belongs to a public-private key pair associated with the serving network, and wherein the unencrypted network identifier is a serving network identifier (SID) of the serving network.

3. The method of claim 2, wherein the SID identifies a specific one of a plurality of public-private keys pairs associated with the serving network.

4. The method of claim 1, wherein the public key belongs to a public-private key pair associated with a home network of the UE, and wherein the unencrypted network identifier is a home network identifier (HID) of the home network.

5. The method of claim 4, wherein the HID identifies a specific one of a plurality of public-private keys pairs associated with the home network.

6. The method of claim 1, wherein the first integrity key is generated based at least the K key, the RAND1, and a COUNTER.

7. The method of claim 1, wherein UE specific information further includes a second random number (RAND2).

8. The method of claim 7, further comprising:
    generating, by the UE, an encryption key based on the K key of the UE and the RAND2;
    receiving, by the UE, an initial authentication response (IAS) message in response to the IAR message; and
    decrypting, by the UE, the IAS using the encryption key.

9. The method of claim 7, further comprising:
    generating, by the UE, a first integrity key and a first decryption key based on the K key of the UE and the RAND2;
    receiving, by the UE, an initial authentication response (IAS) message in response to the IAR message, the IAS message including an outer portion and a first MAC signature, the outer portion including at least an encrypted inner portion and a random number;
    determining whether the RAND2 matches the random number in the outer portion of the IAS message;
    generating a second MAC signature by computing a hash function of the outer portion of the IAS message;
    comparing the second MAC signature with the first MAC signature in the IAS message;
    decrypting the encrypted inner portion using the first decryption key when the second MAC signature matches the first MAC signature; and
    verifying the integrity of the IAS message when a counter in the IAS message exceeds an independent counter maintained by the UE.

10. The method of claim 1, wherein UE specific information further includes one or more UE securities capability parameters.

11. The method of claim 1, further comprising:
    sending a security and authentication complete message to the MME, the security and authentication complete message indicating that the UE has confirmed authentication and security establishment.

12. The method of claim 1, wherein IMSI identifies a subscriber identity module (SIM) card installed in the UE.

13. A method for secure authentication, the method comprising:

receiving, by a home subscriber server (HSS) in a home network, an authentication and data request message from a mobility management entity (MME) in a serving network, the authentication and data request message carrying a home network identifier (HID) and an encrypted portion;

decrypting the encrypted portion using a home network private key associated with the HID to obtain user equipment (UE) specific information and a first Message authentication code (MAC) signature, the UE specific information including at least an International Mobile Subscriber Identity (IMSI) of the UE and a first random number (RAND1);

obtaining a first integrity key based on the IMSI of the UE and the RAND1; and verifying the integrity of the authentication and data request message, wherein verifying the integrity of the authentication and data request message comprises generating a second MAC signature by computing a hash function of UE specific information using the first integrity key, and comparing the second MAC signature with the first MAC signature to determine whether the UE specific information originated from the UE.

14. The method of claim 13, wherein verifying the integrity of the authentication and data request message further comprises verifying that the authentication and data message is not a replay attack when a counter in the authentication and data message exceeds an independent counter maintained by the HSS.

15. The method of claim 13, wherein obtaining the first integrity key based on the IMSI of the UE and the RAND1 comprises sending an authentication request carrying the IMSI and the RAND1 to an authentication server, and receiving, in response to the authentication request, an authentication response carrying the first integrity key from the authentication server.

16. The method of claim 13, wherein UE specific information further includes a second random number (RAND2).

17. The method of claim 13, further comprising:
obtaining a second integrity key based on the IMSI of the UE and the RAND2; and
transmitting an authentication information response message to the MME in response to the authentication and data request message, the authentication and data response message including the second integrity key.

18. The method of claim 17, wherein obtaining the second integrity key based on the IMSI of the UE and the RAND2 comprises sending an authentication request carrying the IMSI and the RAND2 to an authentication server, and receiving, in response to the authentication request, an authentication response carrying the second integrity key from the authentication server.

19. The method of claim 18, wherein the authentication response further includes an encryption key.

20. A method for secure authentication, the method comprising:
generating, by a user equipment (UE), a first encryption key based on a pre-provisioned key of the UE and a first random number (RAND1);
encrypting at least an International Mobile Subscriber Identity (IMSI) of the UE and the RAND1 using the first encryption key to form an encrypted inner portion;
encrypting at least the encrypted inner portion, the RAND1, and the IMSI using a public key to form an encrypted outer portion; and sending an initial authentication request (IAR) message to a base station in a serving network, the IAR message carrying the encrypted outer portion and an unencrypted network identifier.

21. The method of claim 20, wherein the public key belongs to a public-private key pair associated with the serving network, and wherein the unencrypted network identifier is a serving network identifier (SID) of the serving network.

22. The method of claim 21, wherein the public key belongs to a public-private key pair associated with a home network of the UE, and wherein the unencrypted network identifier is an unencrypted home network identifier (HID) of the home network.

23. The method of claim 21, wherein a second random number (RAND2) is encrypted along with the IMSI and the RAND1 to form the encrypted inner portion.

24. The method of claim 21, further comprising:
receiving an initial authentication response (IAS) message from the MME, the IAS message including encrypted data and an unencrypted random number.

25. The method of claim 24, further comprising:
comparing the unencrypted random number in the IAS message with the RAND2;
generating a second encryption key based on the pre-provisioned key of the UE and the RAND2 when the unencrypted random number in the IAS message matches the RAND2; and
decrypting the encrypted data in the IAS message using the second encryption key to obtain a key set identifier (KSI) associated with a non-access stratum (NAS) ciphering algorithm.

26. The method of claim 20, further comprising:
sending a security and authentication complete message to the MME, the security and authentication complete message indicating that the UE has confirmed authentication and security establishment.

27. A method for secure authentication, the method comprising:
receiving, by a mobility management entity (MME) in a serving network, an initial authentication request (IAR) message from a user equipment (UE), the IAR message carrying an encrypted outer portion and an unencrypted network identifier;
decrypting the encrypted outer portion using a private key associated with the serving network to obtain an International Mobile Subscriber Identity (IMSI) of the UE, a first random number (RAND1), and an encrypted inner portion; and
sending an authentication and data request message to a home subscriber server (HSS) in a home network of the UE, the authentication and data request message including at least the IMSI, RAND1, and the encrypted inner portion.

28. A method for secure authentication, the method comprising:
receiving, by a home subscriber server (HSS) in a home network, an authentication and data request message from a mobility management entity (MME) in a serving network, the authentication and data request message carrying at least an encrypted outer portion;
decrypting the encrypted outer portion using a private key associated with the home network to obtain an International Mobile Subscriber Identity (IMSI) of a user equipment (UE), a first random number (RAND1), and an encrypted inner-portion;

generating a first encryption key based on a pre-provisioned key (K key) of the UE and the RAND1;
decrypting the encrypted inner-portion based on the first encryption key to obtain a second random number (RAND2);
generating a second encryption key based on the pre-provisioned key of the UE and the RAND2; and
sending an authentication and data response message carrying the second encryption key to the MME, the second encryption key being used to encrypt and decrypt non-access stratum (NAS) protocol messages exchanged between the MME and the UE.

29. A user equipment (UE) comprising:
a non-transitory memory storage comprising instructions; and
one or more processors in communication with the memory storage, wherein the one or more processors execute the instructions to:

generate a first integrity key based at least on a pre-provisioned key (K key) of the UE and a first random number (RAND1);
generate a message authentication code (MAC) signature by computing a hash function of UE specific information using the first integrity key, the UE specific information including at least an International Mobile Subscriber Identity (IMSI) of the UE and the RAND1;
encrypt the UE specific information and the MAC signature using a public key to form an encrypted portion; and
send an initial authentication request (IAR) message to a base station in a serving network, the JAR message carrying the encrypted portion and an unencrypted network identifier.

* * * * *